(12) United States Patent
Schaufler

(10) Patent No.: US 8,379,924 B2
(45) Date of Patent: Feb. 19, 2013

(54) REAL TIME ENVIRONMENT MODEL GENERATION SYSTEM

(75) Inventor: Roland Schaufler, Kirshardt-Berwangen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 981 days.

(21) Appl. No.: 12/416,030

(22) Filed: Mar. 31, 2009

(65) Prior Publication Data

US 2009/0268947 A1 Oct. 29, 2009

(30) Foreign Application Priority Data

Mar. 31, 2008 (EP) ................................. 08006386

(51) Int. Cl.
*G06K 9/00* (2006.01)
(52) U.S. Cl. .......... 382/104; 348/113; 701/29.1; 701/28
(58) Field of Classification Search ................... 382/100, 382/104; 701/1, 28, 29.1; 348/113
See application file for complete search history.

(56) References Cited

U.S. PATENT DOCUMENTS

| | | | |
|---|---|---|---|
| 6,130,706 A | 10/2000 | Hart, Jr. et al. | |
| 6,684,255 B1 | 1/2004 | Martin | |
| 7,864,032 B2 * | 1/2011 | Kogure et al. ................ | 340/435 |
| 2007/0003130 A1 | 1/2007 | Goerick et al. | |
| 2007/0080968 A1 | 4/2007 | Kogure et al. | |
| 2007/0100551 A1 * | 5/2007 | Ishikura ........................ | 701/301 |
| 2007/0109111 A1 * | 5/2007 | Breed et al. ................... | 340/435 |
| 2007/0165910 A1 * | 7/2007 | Nagaoka et al. .............. | 382/104 |

FOREIGN PATENT DOCUMENTS

| | | |
|---|---|---|
| DE | 19954001 A1 | 5/2001 |
| EP | 0965948 A2 | 12/1999 |
| EP | 1115250 A1 | 7/2001 |
| EP | 0965948 A3 | 3/2002 |
| EP | 1462762 A1 | 9/2004 |
| EP | 1772840 * | 4/2007 |

OTHER PUBLICATIONS

Dickmanns, Ernst D.; Dynamic Vision for Perception and Control of Motion; 2007, Springer Verlag, London; pp. 395-397.
Backer, Gerriet; Modellierung visueller Aufmerksamkeit im Computer-Sehen: Ein zweistufiges Selektionsmodell fur ein Aktives Sehsystem; Hamburg; Jan. 1, 2003; pp. 1-207.

(Continued)

*Primary Examiner* — Brian P Werner
*Assistant Examiner* — Shefali Goradia
(74) *Attorney, Agent, or Firm* — O'Shea Getz P.C.

(57) ABSTRACT

A vehicle environment monitoring system is provided that is based on a three-dimensional vector model. The three-dimensional vector model of the vehicle's environment is generated on the basis of the image data captured by at least one three-dimensional camera. Out of the image data, particular data are extracted for generating the three-dimensional vector model in order to reduce the data volume. For data extraction, a data extraction algorithm is applied that is determined in accordance with at least one parameter that relates to the situation of the vehicle. Therefore, targeted data extraction is performed for generating a three-dimensional model that is particularly adapted for an application that is desired in the current vehicle situation. The applications of the vector model include driver assistance, external monitoring and vehicle control, as well as recording in an event data recorder. In one implementation, a sequence of three-dimensional vector models, representing a three-dimensional space-and-time model, is generated.

72 Claims, 10 Drawing Sheets

OTHER PUBLICATIONS

Maki, et al.; Disparity Selection in Binocular Pursuit; Proc. 4th IAPR Workshop in MVA; 1994; pp. 1-6.
Dickmanns, Ernst D.; Dynamic Vision for Perception and Control of Motion; Chapter 2; Basic Relations; Image Sequences—"The World"; 2007; pp. 21-58.
Dickmanns, Ernst D.; Dynamic Vision for Perception and Control of Motion; Chapter 4; Application Domains, Missions, and Situations; 2007; pp. 111-122.
Dickmanns, Ernst D.; Dynamic Vision for Perception and Control of Motion; Chapter 5; Extraction of Visual Features; 2007; pp. 123-182.
Dickmanns, Ernst D.; Dynamic Vision for Perception and Control of Motion; Chapter 11; Perception of Obstacles and Vehicles; 2007; pp. 331-376.
Funkhouser, Thomas A. et al.; Adaptive Display Algorithm for Interactive Frame Rates During Visualization of Complex Virtual Environments; Proceedings of the Siggraph 1993; Aug. 1993; 8pp.

* cited by examiner

REAL TIME ENVIRONMENT MODEL GENERATION SYSTEM

RELATED APPLICATIONS

This application claims priority of European Patent Application Serial Number 08 006 386.0, filed on Mar. 31, 2008, titled METHOD AND DEVICE FOR GENERATING A REAL TIME ENVIRONMENT MODEL FOR VEHICLES, which application is incorporated in its entirety by reference in this application.

BACKGROUND OF THE INVENTION

1. Field of the Invention

The present invention relates to vehicle environment models for driver assistance systems. In particular, the present invention relates to generating camera-based vehicle environment models for real time applications.

2. Related Art

Contemporary vehicles are equipped with a series of sensors. Vehicle sensors include sensors of a first kind for detecting variables that are related to the status of the vehicle itself, as well as sensors of a second kind for detecting variables of the environment of the vehicle.

Examples of first type sensors include sensors for motor rotation speed, brake status, throttle position, vehicle speed and acceleration, steering position, tire pressure, occupant position, seatbelt position, passenger airbag status and others. Sensors of the second type include temperature sensors, distance sensors, antennae of telematic and navigation systems and others.

In particular, in modern practice, it is becoming more and more common to also equip vehicles with cameras. A vehicle can be equipped with a single or a plurality of cameras mounted at different positions inside and/or outside the vehicle. Cameras mounted inside a vehicle can be employed for monitoring objects and events occurring inside the vehicle, and are specifically used in vehicles of public transportation, such as buses and coaches. Cameras for monitoring the environment of the vehicle are specifically designed to capture images of a certain sector of a vehicle's environment.

Data obtained from sensors of a vehicle, including cameras, are employed for a variety of purposes. A basic class of functions, for which it is necessary to collect and further process sensor data, is the field of driver assistance systems. Driver assistance systems known in the art cover a large range of functions. Systems exist that simply provide a driver with particular information, including warning in the case of possible emergency situations inside or outside the vehicle. More sophisticated driver assistance systems enhance a driver's comfort by interfering with or partly taking over control functions in complicated or critical driving situations. Examples for the latter class of driver assistance systems are antilock brake systems (ABS), traction control systems (PCS), and electronic stability programs (ESP). Further systems that are currently under development and do not yet belong to default vehicle equipment include adaptive cruise control, intelligent speed adaptation and predictive safety systems.

Furthermore, vehicle sensors are employed for environment monitoring for purposes other than vehicle safety and control, such as for patrol vehicles monitoring parked cars or for recording in event data recorders. Event data recorders (EDR, also known as "black box") record internal and external information gathered by various sensors of a vehicle to enable a reconstruction of events that have occurred in the last few seconds or minutes immediately before an accident.

FIG. 1 illustrates an example of a vehicle (a car 100) that is equipped with a plurality of sensors, including a camera 102$a$ and further sensors 102$b$ and 102$c$. The car is moreover equipped with an antenna 104, which enables reception and transmission of data, including, for instance, those of a satellite navigation system. Sensor data is forwarded to a processing unit 106, where the data are processed to generate a response. A response generated by the processing unit 106 may include signals for triggering any driver assistance functions, including those commonly employed by the above mentioned driver assistance systems. In the simplest case, the processing unit issues signals comprising information to be notified to a driver. In particular, notification can be issued for display on a display device 108 that is arranged near the driver's seat.

FIG. 2 is a principal block scheme of a conventional driver assistance system. Data collected by a plurality of sensors ($s_1$, $s_2$, $s_3$, ..., $s_n$ in FIG. 2) are fed into processing unit 106. Processing unit 106 generates a response on the basis of processing the data received from the sensors. The response includes signals that are either forwarded to a device for notifying the driver, or to specific units for particular control functions.

In the particular case of employing cameras, a rather complete information of a section of a vehicle's environment can be obtained by capturing an image. By employing several cameras, a range of a vehicle's environment covers all directions, rather than only a particular section, such as a section in forward direction. Cameras mounted to a vehicle include two-dimensional (2D) and three-dimensional (3D) cameras. While 3D-cameras are capable of capturing a three-dimensional image in one shot, by employing two separate optical systems mounted adjacent to each other, in a similar manner as a stereoscopic view is achieved with the help of a pair of human eyes, three-dimensional environment information of a moving vehicle can also be obtained by only employing a single two-dimensional camera. Therefore, additional information from sensors detecting a moving speed and direction, as well as changes in vehicle orientation are employed. On the basis of the additional data, an approximate three-dimensional environment model can be generated, by evaluating changes between two-dimensional images that have been captured at subsequent instances of time with respect to said detected vehicle motion parameters.

Although cameras are generally capable of providing rather complete information, the employment of cameras as sensors suffers from having to provide a large amount of information that is redundant or irrelevant in a particular situation, or in view of the particular purpose for which the information is to be used. Accordingly, a large processing time is required to process the large volume of data included in images captured by cameras. Therefore, in the case of employing cameras as sensors of a vehicle, the advantage of obtaining more complete information compared to a case where only specific sensors are employed, goes hand in hand with a drawback of large processing times required for obtaining a response to the received data. However, specifically in the case of driver assisting systems utilized to issue a warning to avoid a threatening emergency situation, or to trigger active and/or passive countermeasures, the importance of processing time is crucial.

A possibility of improving the described situation, and achieving lower processing times, may be achieved by performing a pre-processing procedure of captured image data. In this regard, to reduce the amount of data to be processed for responding, only particular data are extracted from an image. Such pre-processing steps may include, for instance, filtering, rasterization and vectorisation.

It is, however, a drawback of employing pre-processed information from images captured by cameras attached to a vehicle because the pre-processing affects the information included in the images in a predefined, static manner. The pre-processing steps are adapted to specific requirements in accordance with particular situations in which a camera is utilized for environment monitoring. Such specific situations and the respective circumstances under which the captured information is to be utilized, includes, however, a large range having their own very specific and different requirements. For example, environment monitoring by cameras can be used to avoid potential collisions when driving on a motorway at a high speed, and in dense traffic. On the other hand, cameras of a vehicle may assist the driver in parking the vehicle, in a small amount of space. While in the first case only rather general information concerning other vehicles in the immediate vicinity of the vehicle are necessary, the time available for taking a decision is extremely small, i.e., in the range of a few seconds. In the second case, processing time is not as crucial as in the first case, but the assistance will be more helpful, the more complete the available information.

Another case that is particularly influenced by appropriate pre-processing concerns storage in an event data recorder. The storage capacity of an event data recorder is generally limited. Therefore, the depth of the history that can be stored in an event data recorder (i.e., the time period immediately before an accident, for which the event data recorder can store data) considerably depends on the amount of data to be stored representing the overall (external and internal data) vehicle situation at each single instance of time. On the other hand, the event data recorder does not require the inclusion of complete image information, but rather only information concerning position, as well as absolute value and direction of the velocity of the vehicle itself, and all objects and subjects in the immediate neighborhood of the driven vehicle. Accordingly, a need exists to provide an improved system for more efficiently obtaining environment monitoring information of a camera-equipped vehicle.

SUMMARY

To address the above illustrated problems with existing vehicle environment monitoring systems, a method of monitoring the environment of a camera-equipped vehicle is provided that utilizes a three-dimensional image of the environment of the vehicle. A three-dimensional image is first captured that represents a predetermined area of the vehicle environment. A data extraction algorithm is then utilized to reduce the amount of information acquired in the image capturing step based on at least one parameter characterizing the vehicle situation. The amount of information acquired in the image capturing step is then reduced by extracting data from the three-dimensional image employing the data extraction algorithm. A three-dimensional vector model of the vehicle environment is then generated from the data extracted from the three-dimensional image.

An environment monitoring device is also provided that monitors the environment of a vehicle. In one example, the system includes a three-dimensional camera for capturing an image of the environment of the vehicle. The image represents a predetermined area of the vehicle environment. The environment monitoring system further includes a first processing unit for processing the information required by the three-dimensional camera. The first processing unit includes a data extracting unit for extracting data from the image by employing a data extraction algorithm. The first processing unit further includes determining unit for determining the data extraction algorithm to be employed by the data extracting unit based on at least one parameter characterizing the vehicle situation. Moreover, the first processing unit includes a model generating unit for generating a three-dimensional vector model of the vehicle environment from the data extracted from the image.

According to another implementation of the invention, a vehicle environment monitoring system is provided that is based on a three-dimensional vector model. The three-dimensional vector model of the vehicle's environment is generated on the basis of the image data captured by at least one three-dimensional camera. Out of the image data, particular data are extracted for generating the three-dimensional vector model to reduce the data volume. For data extraction, a data extraction algorithm is applied that is determined in accordance with at least one parameter that relates to the situation of the vehicle. Accordingly, the system specifically targets data extraction that is performed for generating a three-dimensional model particularly adapted for an application that is desired in the current vehicle situation. The applications of the vector model may include driver assistance, external monitoring and vehicle control, as well as recording in an event data recorder, to which a sequence of three-dimensional vector models, representing a three-dimensional space-and-time model, may be generated.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

In a vehicle equipped with a series of sensors that includes at least one three-dimensional camera, a situation-adapted three-dimensional vector model of the current vehicle environment situation may be generated in real time. The model includes all relevant static and moving objects in a prior certified range of the vehicle's environment, i.e., in a space area surrounding the vehicle. The objects may be captured by the camera and further sensors and then classified with the help of a database and special algorithms. The model represents an interface that decouples the sensors of a vehicle from the intelligence for generating activities in response to the information contained in the data collected by the sensors, and represented by the vector model. A sequence of three-dimensional vector models generated at different instances of time represents a three-dimensional space-and-time model.

By using a three-dimensional space-and-time model of the vehicle environment rather than data obtained from various cameras and sensors themselves, maximum information density is achieved. The real world is thus compressed into a model by getting rid of irrelevant, useless or redundant information in a manner that is specifically targeted for a particular situation where the model is generated, and a particular aim, for which the model is to be utilized. Accordingly, memory space and processing time can be minimized, and the possibilities for interpreting the information may be improved.

Figure 1:
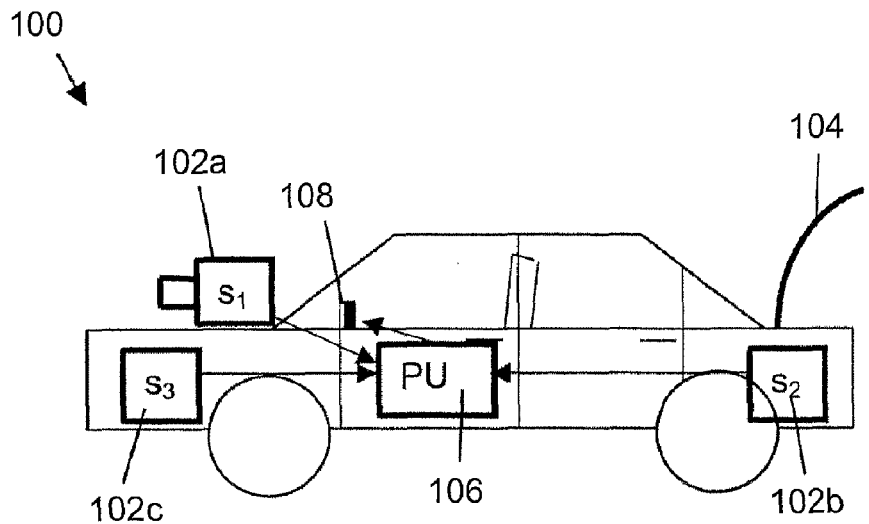
FIG. 1 illustrates an example of a vehicle including a prior art environment monitoring device.
Figure 2:
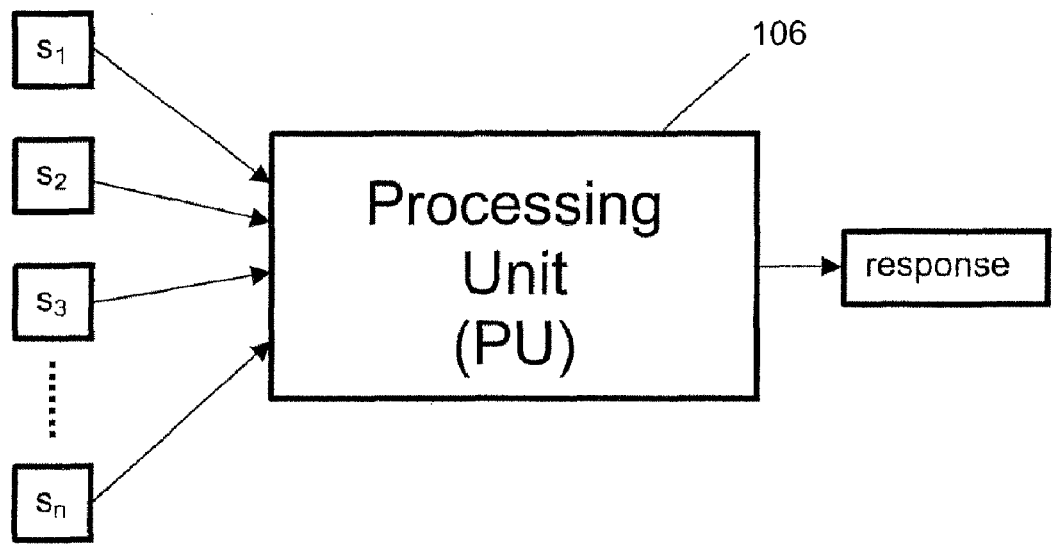
FIG. 2 illustrates in a block diagram the scheme of a prior art environment monitoring system.
Figure 3:
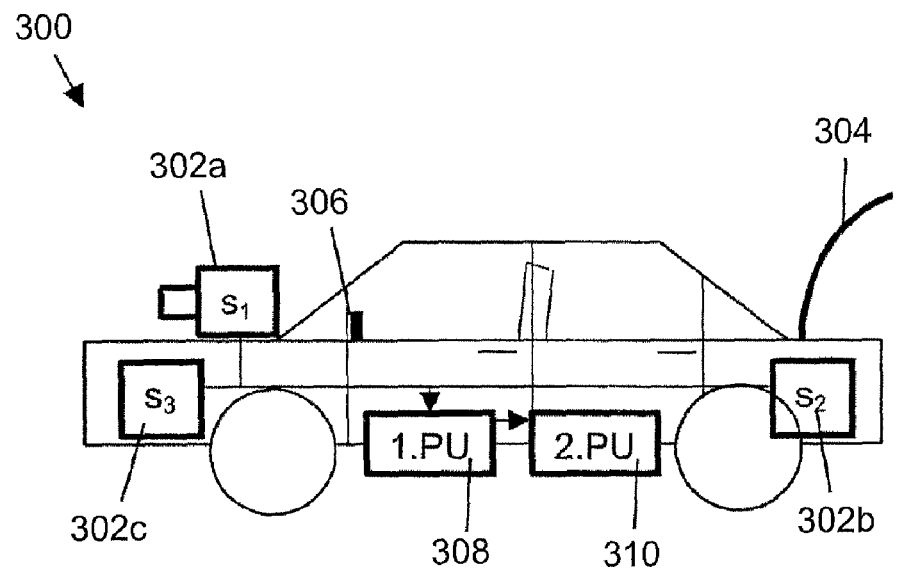
FIG. 3 schematically illustrates a vehicle having one example of an environment monitoring system in accordance with the invention.

FIG. 3 is a general overview of a vehicle 300 including one example of an environment monitoring system in accordance with the present invention. The system includes a plurality of sensors $s_1, s_2, s_3, \ldots, s_n$. Among the sensors is at least one three-dimensional camera, which in this example, is represented by 302a.

In one example of an implementation, a plurality of cameras of different types (not shown) may be included in the environment monitoring system, where different types of cameras cover different viewing angles. Cameras to watch the traffic in front of the car may capture images that can be utilized to assist a driver with pre-crash detection, land departure warning, traffic sign recognition, distance of objects measurement, active cruise control, etc. Furthermore, an internal camera can be employed to replace sensors that recognize the number of passengers, their state and behavior, the seatbelt state etc. to control, for instance, the behavior of airbags.

The three-dimensional camera is generally capable of capturing an image representing information about a certain sector (i.e., corresponding to a camera's view angle) of the vehicle's environment. A conventional three-dimensional camera (e.g., stereoscopic camera) includes two optical systems at slightly different positions having a small distance with respect to each other. Three-dimensional information is generated on the basis of a perspective transformation detected by comparing the two-dimensional images captured from the two different optical systems. A conventional three-dimensional camera, however, has certain drawbacks. For instance, it is difficult to reconstruct distance information with a stereoscopic three-dimensional camera for objects covering a large area with very similar grey scale values, such as walls or street surfaces. It will, for instance, be difficult to generate distance information to assist the driver in parking a car in front of a wall of a building on the basis of a stereoscopic three-dimensional camera.

More sophisticated three-dimensional camera systems include so-called three-dimensional time-of-flight (TOF) sensors. A TOF based three-dimensional camera captures an image of an object in the same manner as a conventional camera. Additionally, a distance measurement is performed on the basis of phase difference between light signals sent from the camera to the object and reflected therefrom, and a reference signal. A correlation receiver detects the light signal reflected from the object and correlates the received signal with a reference signal that is transmitted from the camera via a direct path, over a predetermined distance. By evaluating the phase difference, the distance between the camera and the object can be safely determined. By evaluating the distances between the camera and the plurality of objects captured in an image, a three-dimensional representation of an image is obtained. A photonic mixer device (PMD) camera may be employed for these purposes.

Optionally, the environment monitoring system includes further sensors 302b, 302c other than cameras. Sensors 302b, 302c may, for example, include, among other devices, a motion sensor, an accelerometer, a temperature sensor, a radar sensor, an infrared sensor. An antenna 304 can represent part of a navigation system for receiving navigation information and can, moreover, be employed for transmitting data from the environment monitoring system to a remote location. Also, in correspondence with an embodiment of the present invention, re-transmitted data from a remote location can be employed for driver assistance and remote control functions. Further, a display 306 arranged near the position of the driver of the vehicle is utilized to display, inter alia, notifications to the driver generated by the environment monitoring system.

The environment monitoring system of the present invention further includes a first processing unit 308, the operation of which will be explained in more detail below. The data collected by the vehicle sensors $s_1, s_2, s_3, \ldots, s_n$, including at least three-dimensional camera 302a, are all forwarded to the first processing unit 308. The first processing unit 308 processes particular data extracted from the sensor data in order to generate a three-dimensional environment model.

In accordance with one example of an implementation, the environment monitoring system further includes a second processing unit 310. In this implementation, the three-dimensional vector model (or, a sequence of three-dimensional vector models representing a three-dimensional time-and-space model) is forwarded to the second processing unit 310. The second processing unit 310 evaluates the three-dimensional vector model for generating responses based on particular aspects of the information contained in the vector model. Responses generated by the second processing unit 310 include, but are not limited to, driver assistance functions, such as collision warning, distance adaptive speed control, lane keeping support, lane change assistance or automatic emergency braking.

In another example of an implementation (not shown in FIG. 3), the three-dimensional vector model generated in the first processing unit 308 may be forwarded to a remote location via antenna 304 for further processing (rather than utilizing a second on-board processing unit as illustrated in FIG. 3). Transmission of the three-dimensional vector model to a remote location can be accomplished via radio, via a cellular telephone line or other transmission means known to those skilled in the art.

In yet another implementation, the vector models generated in the first processing unit 308 may be forwarded to an event data recorder (not shown in FIG. 3) for crash investigation and/or other purposes.

Figure 4:
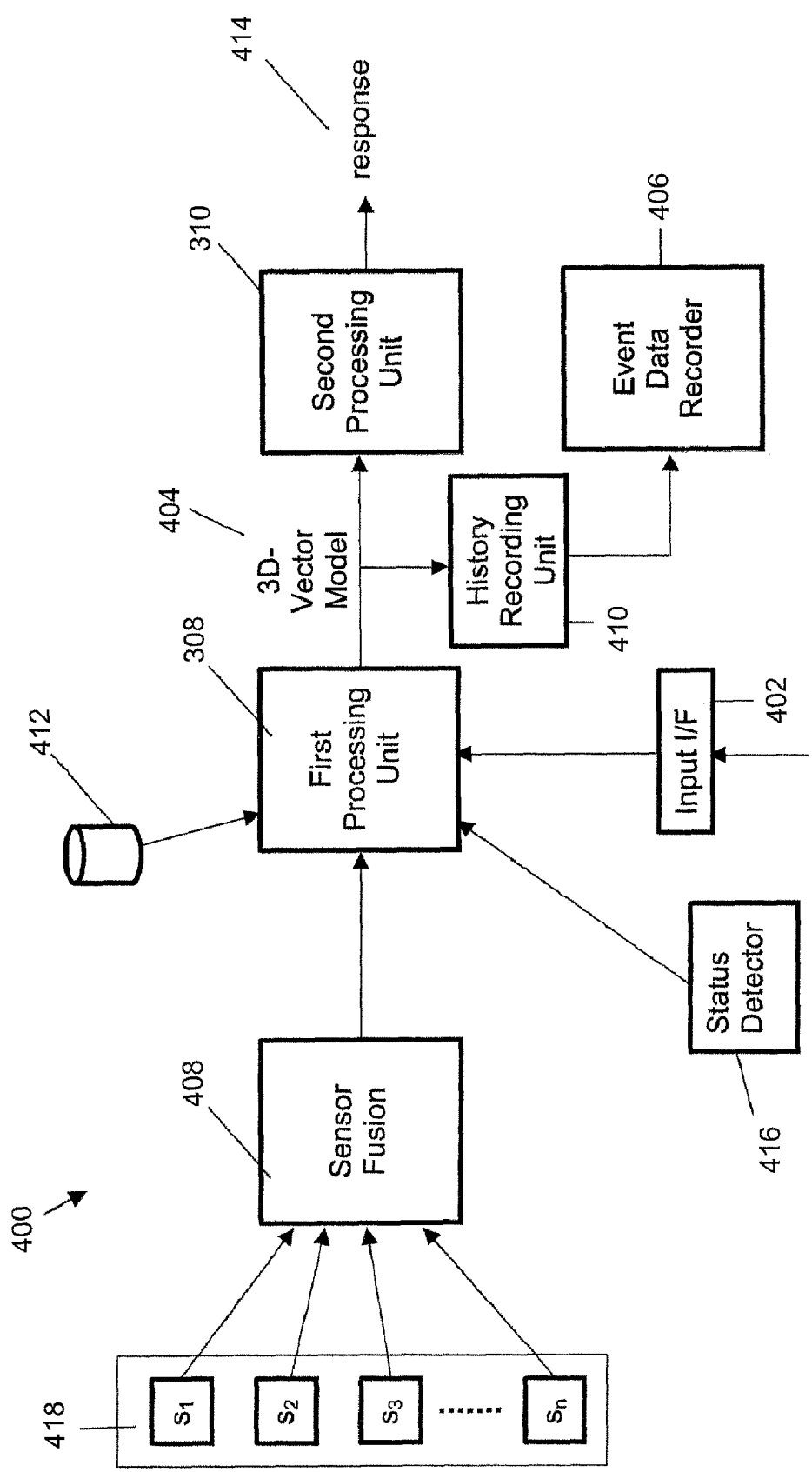
FIG. 4 is a block diagram illustrating one example of an environment monitoring system in accordance with the invention

FIG. 4 is a block diagram illustrating an overall view of an environment monitoring system 400 in accordance with one implementation of the invention. The environment monitoring system is represented by first processing unit 308 for generating a three-dimensional vector model 404 representing at least a part of the vehicle's environment. First processing unit 308 receives data from a plurality of sensors, referred to as $s_1, s_2, s_3, \ldots, s_n$ in sensor complex 418 of FIG. 4. Optionally, environment monitoring system 400 further includes sensor fusion unit 408. Sensor fusion unit 408 may be included to perform sensor fusion processing (as will be explained in further detail in connection with FIG. 6 below), if sensor complex 418 includes sensors of different types.

Figure 5:
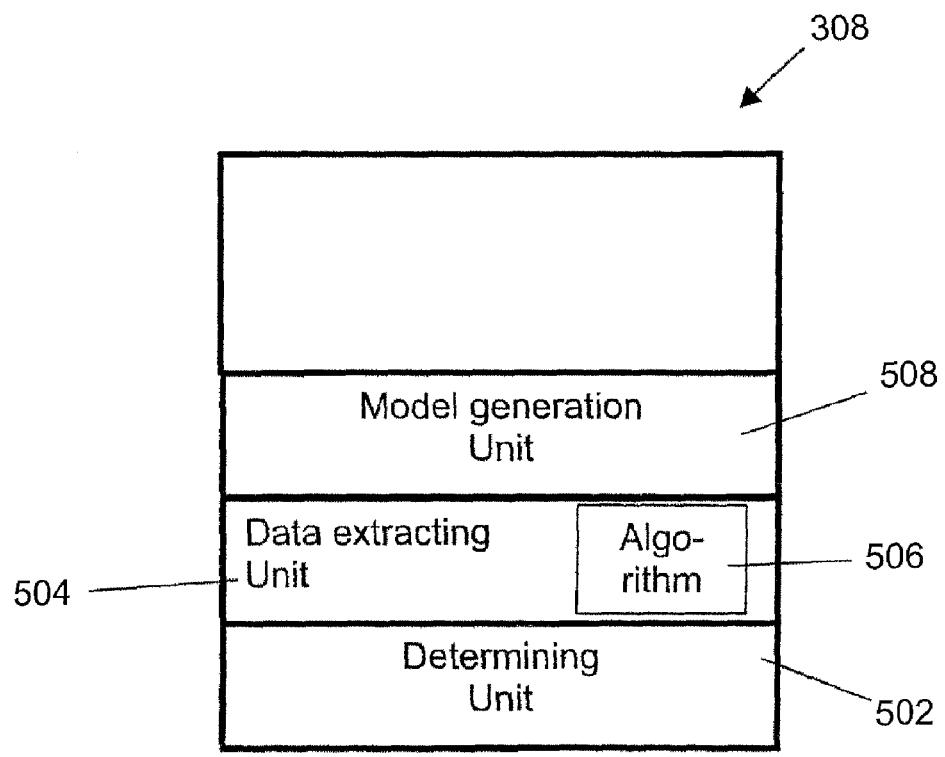
FIG. 5 is a diagram of the first processing unit of the vehicle environment monitoring system of FIG. 4.

FIG. 5 is a more detailed internal view of one example of a first processing unit 308. As shown in FIG. 5, the first processing unit 308 includes determining unit 502, data extracting unit 504, and model generation unit 508. Data extracting unit 504 operates to extract particular data out of the full amount of data received from the three-dimensional camera, and optionally from other cameras and/or sensors, in which case, sensor fusion data may be extracted. Only that part of data that is extracted by data extracting unit 504 is forwarded to model generation unit 508 and forms the basis for generating three-dimensional vector model 404 (FIG. 4). Data that are not selected for extraction by data extracting unit 504 are discarded and not further processed in first processing unit 308.

According to one implementation of the invention, in first processing unit 308, the algorithm for extracting data in data extracting unit 504 is not static, but depends on the vehicle situation at the moment of generating the model. To determine a situation dependent data extracting algorithm 506, first processing unit 308 includes determining unit 502. Determining unit 502 determines a particular data extracting algorithm to be employed by data extracting unit 504 on the basis of determining the current vehicle situation. The vehicle situation is characterized by one or a plurality of parameters, including those describing internal conditions and events of the vehicle, the vehicle's motion status and environmental conditions and events in an area surrounding the vehicle. Parameters characterizing the vehicle situation can be obtained from the sensor data received by first processing unit 308, including three-dimensional images and/or sensor fusion data. Furthermore, in one example, determining unit 502 receives additional information from other sources, such as status detectors 416 and input interface 402 (shown in FIG. 4). Turning to FIG. 4, the status detector 416 may include a plurality of sensors detecting information about the status of the vehicle itself, such as velocity sensors or accelerometers, or brake status sensors. The status detector 416 may also include cameras and sensors for detecting the occupation of seats of the vehicles with people and their behavior, seatbelt, and airbag status. Data received via input interface unit 402 may include user defined data, such as defining a particular operation mode of vehicle environment monitoring system, requiring a particular data extraction algorithm 506 to be applied by data extracting unit 504, shown in FIG. 5.

On the basis of the data extracted by data extracting unit 504, model generation unit 508 generates three-dimensional vector model 404. In a three-dimensional vector model, objects of the real world are represented by way of points, lines and areas. Points are represented by their co-ordinates with respect to a definite co-ordinate system. In accordance with the invention, a coordinate system fixed to the vehicle may be employed for the vector model. Coordinates of a point with respect to the point of origin of the coordinate system are called a "vector". In the vector model, (straight) lines are defined by the vectors defining their end points. Areas are defined in the vector model by a plurality of lines, forming a polygon.

It is evident from the general definition of the vector model that the amount of data, and therefore the required memory resources, basically depend upon the accuracy for representing lines and areas in the vector model. Therefore, the general task to be solved in creating vector model 404 is to determine an optimal trade-off between data amount and model accuracy. As indicated above, the data amount required to represent the vector model is closely related to processing time for generating and further processing vector model 404, as well as required storage capacity, for instance, in an event data recorder, such as event data recorder 406 shown in FIG. 4.

Additionally, the vector of a vector model can be associated with object information of a standard object represented by the vector. Standard objects are objects of predefined classes of an object model, which classes of object models will be described in more detail below with reference to FIG. 10.

By employing object information including a reference to a standard object class, extended objects including a plurality of points, lines and areas can be approximately described by way of only a few vectors, defining, for instance, a particular point of the object, as well as object size and orientation with respect to the particular point. Further information representing, for instance, the shape of the objects predefined in the object model is stored in association with the standard object class. To associate a vector of the vector model with object information of a particular object class of an object model, the first processing unit 308 is associated with database 412. Database 412 pre-stores object information, in accordance with an object model of one implementation of the invention.

A person skilled in the art is aware that the amount of information that can be represented by an object model, including object information such as color information, or information about texture of an area, is limited only by the available storage and processing capacity.

For further processing, as illustrated in FIGS. 3 and 4, three-dimensional vector model 404 generated in first processing unit 308 is forwarded to second processing unit 310. Second processing unit 310 includes logic to evaluate the three-dimensional vector model and to generate a response signal 414. Response signal 414 may be employed for driver assistance, taking active and passive countermeasures in case of a threatening accident and further purposes, to be described in detail below. According to one example approach, where first processing unit 308 and second processing unit 310, as well as the respective processing steps performed by units 300 and 310 are decoupled from each other by three-dimensional vector model 404, processing time can be saved for generating a more targeted response 414, on the basis of a three-dimensional vector model 404 including those data that are particularly relevant for generating the response desired in a specific situation.

Alternatively, or in parallel, data of three-dimensional vector model 404 can be saved in event data recorder 406. In the illustrated example, the storing processing of the three-dimensional vector model 404 is controlled by history recording unit 410.

As a further alternative, three-dimensional vector model 404 can be transmitted via antenna 304 (FIG. 3) to an external (remote) location, for further processing, in place of, or in addition to, the processing shown in FIG. 3.

A person skilled in the art is aware that the further processing of the three-dimensional vector model 404 generated by first processing unit 308 is not limited to the foregoing examples. Moreover, several procedures of further processing can be employed in parallel, or subsequently, or alternatively, by a particular environment monitoring device. A person skilled in the art is moreover aware that the described functional units can be represented by specific hardware units, as well as by circuitry including standard components, such as a CPU, RAM etc., appropriately programmed by a program instructing the hardware components to operate in accordance with the invention.

Figure 6:
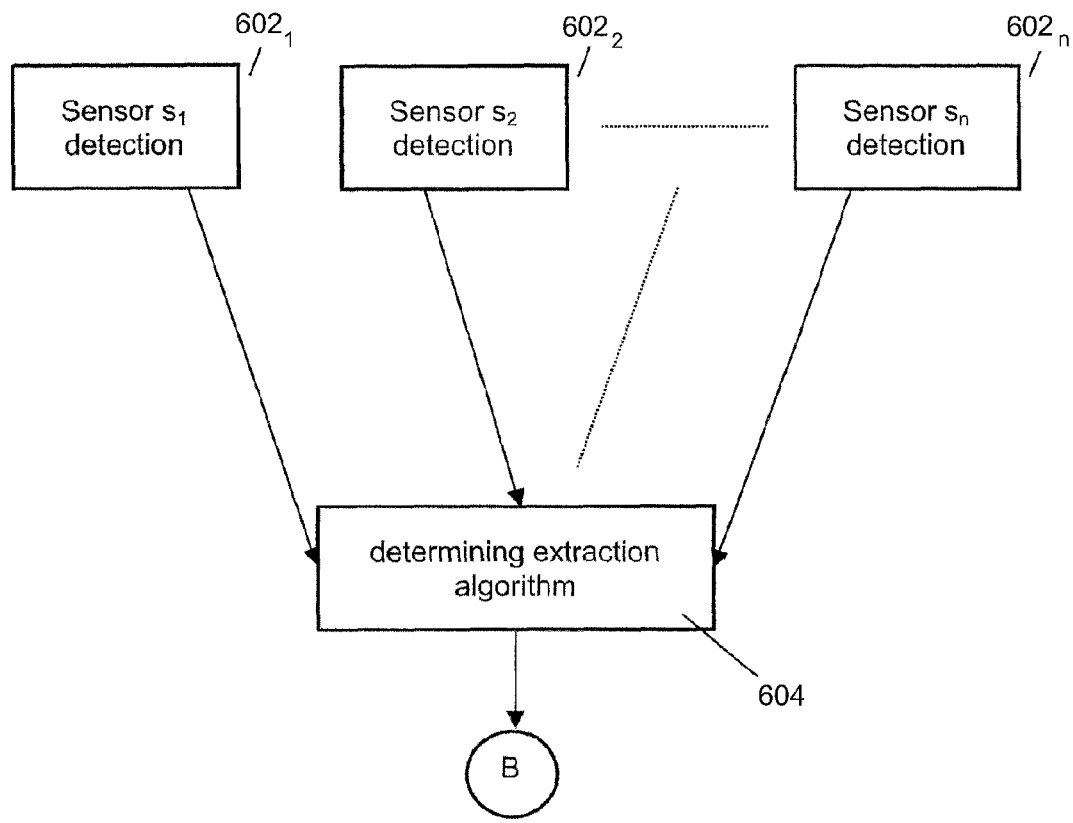
FIG. 6 is a flow chart illustrating an example of sensor fusion employed in the vehicle environment monitoring system of the present invention.

FIG. 6 illustrates an example concept of sensor fusion 408 that may be applied, as illustrated in FIG. 4, where data from a plurality of different sensors are taken into account for generating three-dimensional vector models 404. In a plurality of parallel, independent steps $602_1$, $602_2$, . . . , $602_n$, a plurality of sensors (corresponding to sensor complex 418 of FIG. 4) detect data, in accordance with the particular kind of sensors used. Specifically, the at least one three-dimensional camera 302a (FIG. 3) for capturing an image of the vehicle environment is understood to be a sensor $s_1, s_2, s_3, \ldots, s_n$ represented in FIG. 6. Accordingly, image capturing step 702, (FIG. 7), is considered as a particular example of detection step $602_k$ (k=1 . . . n). Subsequent step 604 receives the data detected by the plurality of sensors $s_1, s_2, \ldots, s_n$, and performs a fusion of the sensors.

Sensor fusion processing combines sensory data from different sources. Data delivered from different sensor attached to the vehicle are transformed into normalized environment information data in sensor fusion unit 408. During sensor fusion, information obtained from different sensors of sensor complex 418 (FIG. 4) are combined in a manner that includes optimization so that the data set resulting from sensor fusion may be improved compared to a pure agglomeration of the data of the individual sensors. Specifically, sensor fusion includes a redundancy check of the information received from different sources, as well as a check for inconsistencies. In the case of detected inconsistencies, a probabilistic approach is generally employed to eliminate the inconsistencies. A person skilled in the art is aware that a plurality of methods and algorithms may be used in sensor fusion, including, but not limited to Kalman filtering and Bayesian networks. In particular, in the case of plural three-dimensional cameras, together covering an environment range around the vehicle, the result of the sensor fusion contains a synthesized camera scene of the environment surrounding the vehicle 300 (FIG. 3).

Figure 7:
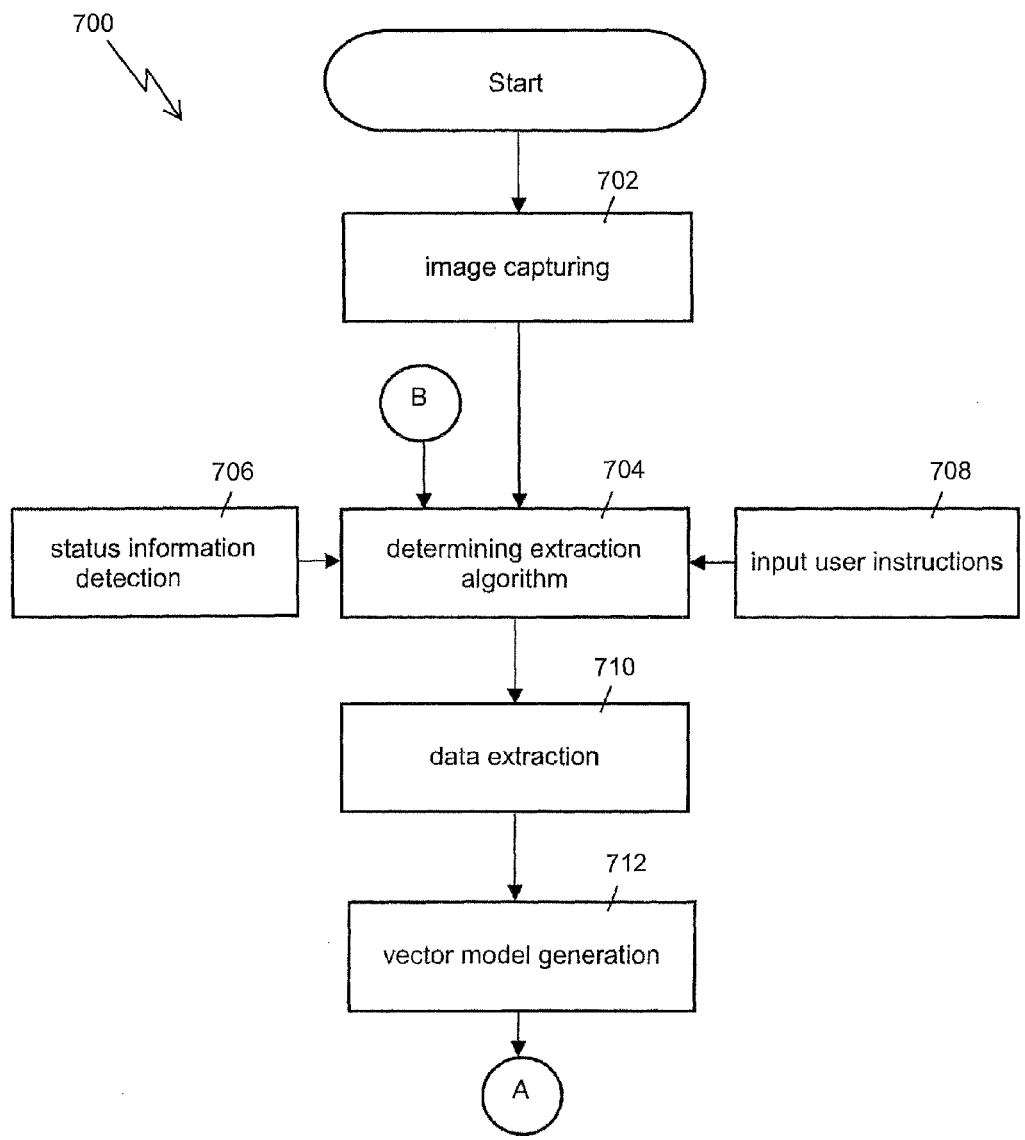
FIG. 7 is a flow chart illustrating one example of the overall processing of a vehicle environment monitoring system of the present invention.

FIG. 7 is a flow chart illustrating an example of the basic processing 700 of a method performed by an environment monitoring system of a vehicle in accordance with the invention. In a first step (702), at least one image is captured by a three-dimensional camera. As indicated above, "three-dimensional camera" includes different kinds of devices, such as a conventional three-dimensional camera having two optical systems, as well as a camera having a time-of-flight sensor.

Subsequent step 704 determines an extraction algorithm for extracting data from the captured image to reduce the amount of data to be processed for generating a three-dimensional vector model. A single or a plurality of parameters that describe the situation of the vehicle may be employed for determining an extraction algorithm. Step 704 can extract parameter information from a captured image itself, as well as from other sources. Other sources include the result of step 706 of detecting status information. Status information detected in step 706 and employed by extraction algorithm determining step 704 can include, for instance, a vehicle velocity. Vehicle velocity is an example of a parameter that can be used to determine an extraction algorithm 506 (FIG. 5), as vehicle velocity influences the desired accuracy, visual angle and distance of the information to be represented by the three-dimensional vector model 404 (FIG. 4).

Alternatively, the extraction algorithm determining step 704 can employ user instructions input in step 708 as a parameter for determining a particular extraction algorithm. User instructions in 708 may include a selection between different operation modes of the environment monitoring device, in accordance with particular positions of a switch etc., where a parameter value determining an extraction algorithm is represented by a signal indicating the particular switch position of an input unit 402.

A parameter for determining an extraction algorithm based on captured image information itself, is represented by information regarding a specific object class, such as a person occurring in the vehicle's environment. If a person suddenly occurs in the vehicle environment, the data extraction algorithm has to concentrate on the information of the person and the surrounding area, in order to determine whether the person is about to interfere with the driving path of the vehicle, by evaluating subsequently generated three-dimensional vector models.

Further examples for employing image information for deciding a data extraction algorithm include judging the importance of particular information. For instance, in the case of driving in a town, an object that is recognized as a traffic light can be marked as to be extracted with high priority.

It is to be further noted that along with pure image information, or alternatively, extraction algorithm determining step 704 can also receive a sensor fusion result described with reference to FIG. 6, as indicated by item B in FIG. 7.

In accordance with one example of an implementation of the invention, step 704 may determine an extraction algorithm by adjusting a parameter of an algorithm that includes variable parameters. Alternatively, or in combination, step 704 can determine a particular data extraction algorithm by selecting out of a predetermined plurality of different data extraction algorithms.

Subsequent step 710 performs data extraction in compliance with the data extraction algorithm determined in step 704. Data extraction algorithms can include, but are not limited to, image filtering on the basis of adjustable filter parameters, determining a part of the visual angle of a camera as a basis for extracting data, and extracting data only from particular ones of a plurality of cameras/sensors. Moreover, data extraction can be performed on the basis of object recognition. If an object is recognized that belongs to a particular object class pre-stored in an object model contained in database 412 (FIG. 4), data to be extracted from an image can be limited to the extraction of an overall position, size and possibly orientation information from the image. Up to a certain accuracy, the remaining information can be extracted from the standard object model, but does not need to be processed directly from the image. Still alternatively, the extraction of image information can be restricted to a particular range surrounding the vehicle, in order to achieve enhanced model accuracy within a limited range, while disregarding undesired information outside the limited range. For instance, in the case when the environment monitoring system is operated for a parking assistant, quite accurate information is desired of a particular portion of the vehicle's environment, namely the parking site and surrounding objects, such as other vehicles, walls, trees, traffic signs, and possibly people. However, more distant objects can be disregarded, even if they are captured by the camera. The examples given above show that, according to the present invention, a basis of data for generating a vector model is created situation dependent and targeted at the goal to be achieved by further processing three-dimensional vector model 404 (FIG. 4).

As indicated above, in operation, a PMD-based TOF-camera may be utilized for the present invention. Further, a PMD sensor array of m×n (e.g., 16×64) infra-red sensitive pixels may be employed, wherein each array registers a distance value corresponding to the incident light.

In particular, such a PMD sensor does not only recognize a generated image of distances, but is also capable of recognizing predetermined objects and return the objects to a processing device reading out the sensor. Such objects are represented by groups of pixels of the same distance which are calculated in the sensor itself.

A further example employing a multi-stage data reduction is the recognition of traffic signs. Traffic signs are firstly recognized as objects by the PMD-sensor, since they represent a pixel group that approaches the sensor with the (negative) velocity of the vehicle. After (and only after) an object has been recognized to be most likely a traffic sign, a second step of recognition is performed. In this regard, the interesting region, which is determined in relation to object size and form, is captured by the camera (CMOS camera) with the best available resolution to determine the exact form and contents of the traffic sign. This may be achieved by classification algorithms and employing a database of possible traffic signs. Accordingly, the amount of data may be step-wisely reduced by a method of exclusion: The PMD sensor reduces the whole image by only returning the relevant area for a recognized object, such that only a particular portion of the CMOS image has to be investigated in detail. The determined region of interest is quickly reduced to a small group of possible signs by the classification algorithm employing the database on the basis of the form (and possibly color) to determine the sign.

Three-dimensional vector model 404 (FIG. 4) is generated in subsequent vector model generation step 712. Creating a vector model on the basis of data extracted from an image is generally based on recognizing discrete physical objects from the image data. Objects of an image are generally distinguished by a zone, where all pixels of similar color or grey scale have the same values. On the other hand, object boundaries correspond to portions in an image where pixel values change abruptly. Before tracing the outline of objects, spatial filtering algorithms may be applied to the image so as to compensate for noise effects etc. Subsequently, the vectors representing vertices, lines, and boundary surfaces of an object are determined for the vector model.

If the vector model further includes object specification information associating an object with a standard object class of an object model, step 712 further includes recognizing that a physical object detected from the image information represents an instance of a particular object class. If it is detected that an object represented in the image to be reflected in three-dimensional vector model 404 (FIG. 4) belongs to one of the standard classes of an object model, that are, for instance, pre-stored in database 414 (FIG. 4), a vector representing a particular point (for instance, a vertex) of the object is associated in step 712 with object specification information of the particular object class. In the case of extended objects, coordinate vectors of the particular point may be associated with further information, indicating, for instance, an orientation and overall size of the object. The additional information can be represented by further vectors, such as a vector indicating the overall perimeter of the object, or an orientation angle of the object with respect to the coordinate axes. Regarding object dimensions, a particular object class may alternatively include sub-classes corresponding to objects of the same main class, but having different sizes.

Steps of further processing three-dimensional vector model 404 (FIG. 4) generated in step 712 are illustrated with reference to FIG. 8. A link between FIG. 7 and FIG. 8 is shown by item A in FIGS. 7 and 8, representing a continuation in the illustrated method or process from FIG. 7 to FIG. 8.

Figure 8:
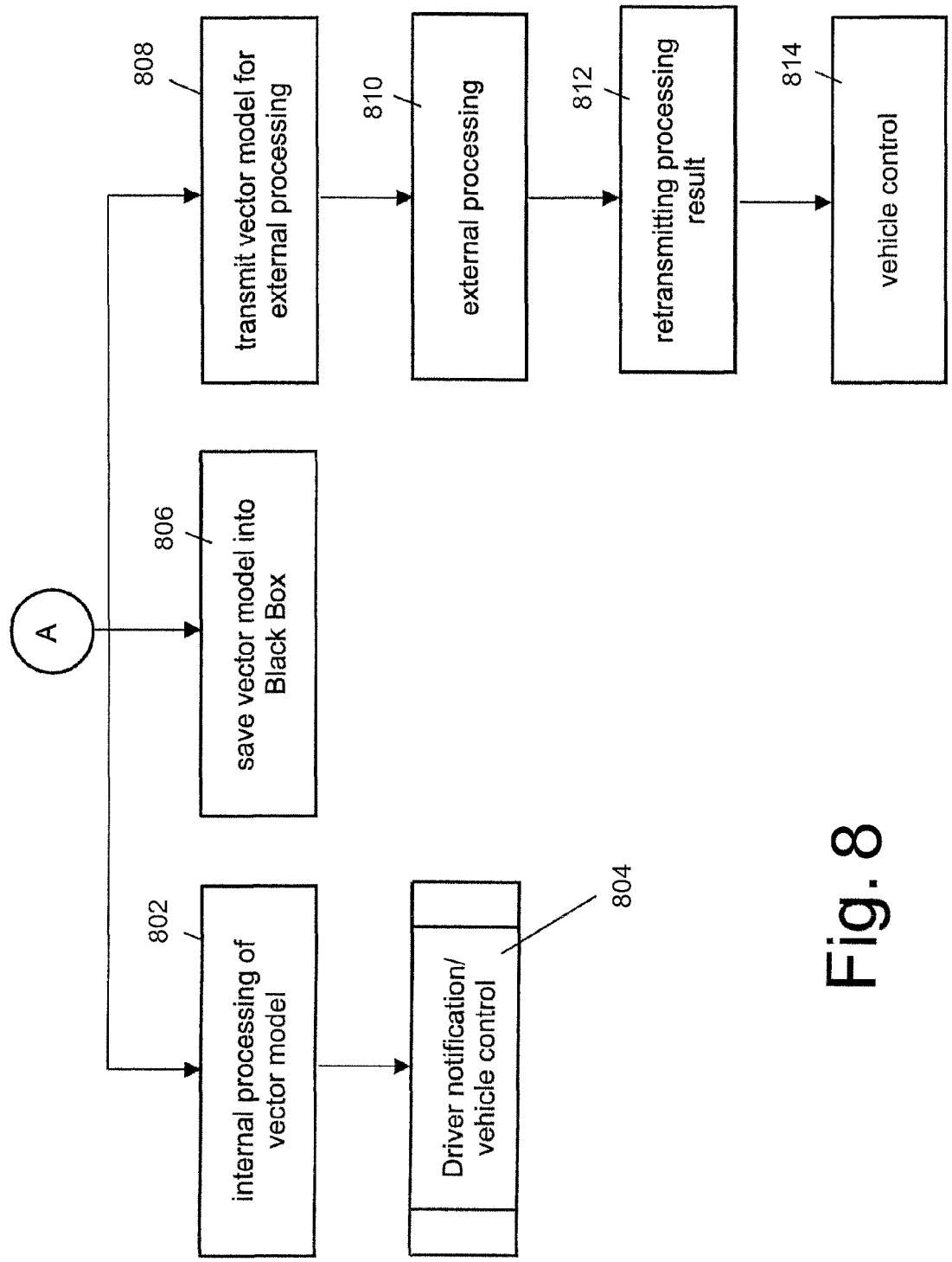
FIG. 8 is a flow chart illustrating a further example of the processing of a three-dimensional vector model of a vehicle's environment.

FIG. 8 illustrates a plurality of further processing paths for the three-dimensional model 404 (FIG. 4) generated in accordance with the processing method illustrated in FIG. 7. It is noted that processing paths described below in connection with FIG. 8 are not limited to only the illustrated processing paths. The examples provided are offered for illustrative purposes only and are not meant to be limiting. It should also be noted that in different implementations individual process paths or combinations of processing paths can be applied in parallel or applied subsequently. It should be further understood that while further processing of a single vector model is possible, generally a sequence of three-dimensional vector models representing a development of the vehicle's environment with time (i.e., three-dimensional space-and-time model) may undergo the described further processing.

According to the processing path illustrated on the left hand side of FIG. 8, three-dimensional vector model 404 is forwarded to second processing unit 310 (FIGS. 3 & 4). In step 802, second processing unit 310 performs vehicle internal further processing of the vector model 404. According one example, internal further processing of three-dimensional vector model 404 performed by second processing unit 310 in step 802 includes, but is not limited to an evaluation of distances between vehicle 300 (FIG. 3) and other objects. Changes in the distances between vehicle 300 and other objects with time are evaluated in a sequence of three-dimensional object models to detect, at an early stage, a possible emergency situation, such as a threatening collision. If the threatening emergency situation is detected at an early stage, appropriate counter-measures can be taken to either avoid it or to minimize the consequences. Particularly effective response measures can be taken upon evaluation of three-dimensional vector model 404 if the vector model further includes object specific information on the basis of an object model. Thus, specifically adapted measures can be taken in response to changes in a vector model with time concerning, for instance, a person being about to interfere with the driving path of the vehicle, a sudden distance change between vehicle 300 and other vehicles being driven in the same direction, such as those changing from a parallel lane into the driving lane of the vehicle 300, or to avoid a collision with a static object such as a tree.

In FIG. 8, possible countermeasures taken in response to further evaluation of three-dimensional vector model 404, or a sequence thereof, are summarized in step 804. An implementation example of step 804 is described below in more detail, in connection with FIG. 9.

Figure 9:
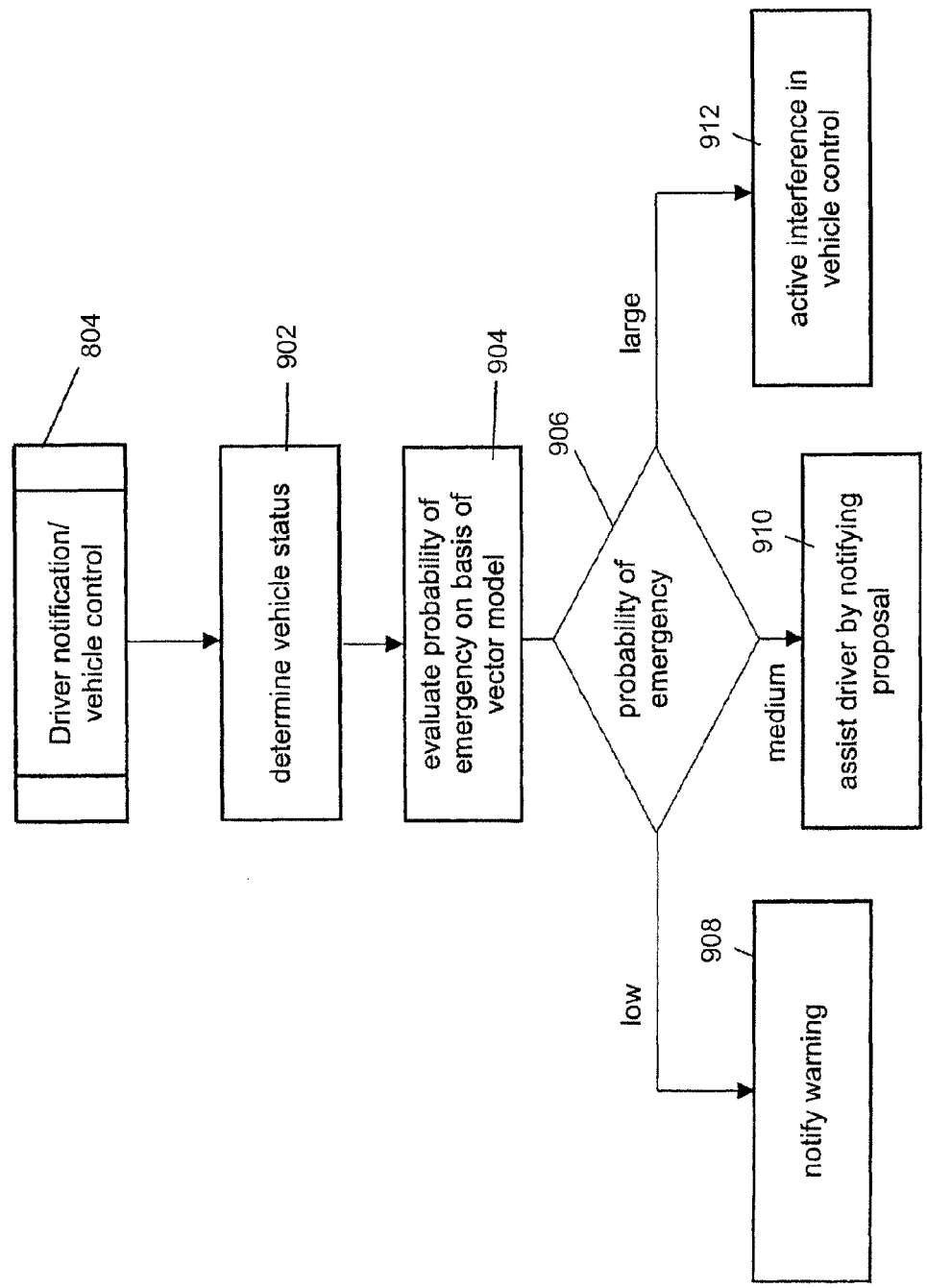
FIG. 9 is a flow chart illustrating one example of an application of a three-dimensional vector model for driver assistance.

With specific reference to FIG. 9, in step 902, the vehicle status is determined on the basis of vehicle status information.

Vehicle status information is received from, for example, vehicle status detectors, such as those described above in connection with item 416 of FIG. 4. In subsequent step 904, the probability of a threatening emergency situation is evaluated. To evaluate the threat, step 904 may take into account vehicle status information obtained in step 902, together with the environment information extracted from the three-dimensional vector model (e.g., a sequence of three-dimensional vector models) in further processing step 802 (FIG. 8). Subsequent judging in step 906 decides whether the probability of an emergency is judged to be low, medium, or high (i.e., rates the emergency). It has to be understood that the general judgment results, "low", "medium" and "high", for example, indicated near three illustrated outgoing paths of box 906, may correspond to well-defined values. For instance, "low" probability may correspond to a probability less than about 30%, "high" probability to a percentage value of more than about 80%, and "medium" probability to a range from about 30% to about 80%. These percentage values are, however, given by way of an example only, as these values are not essential to the invention. Other boundaries and ranking systems between the processing paths may be utilized. Moreover, the number of processing paths judged in step 906 is not limited to three. More than three processing paths may be applied, similarly, less than three, for example two, processing paths may be outgoing of step 906.

According to the example illustrated in FIG. 9, the processing flow further develops to step 908 in the case of a low evaluation level, to step 910 in the case of medium evaluation level, and to step 912 in the case of high probability of an emergency to be expected. In the case of low probability of emergency, the environment monitoring system issues a notification to the driver of a vehicle, including a warning regarding the threatening emergency situation. The notification can be issued in various ways. For example, an acoustic signal may be issued, or a notification is displayed on a display device located within the field of view of the driver. Issuing the notification in the form of a display may be particularly useful, as details of the threatening emergency can be provided in an especially easy manner. An acoustic warning may also be helpful in safely notifies an inattentive driver. Such an acoustic notification can be made distinctive, by employing several different sounds, or a combination of acoustic and visual notification is also possible.

In the case of medium probability of an emergency, at step 910, a notification is issued that includes some more specific assistance to a driver. The assistance may include, for instance, a proposal for a measure to be undertaken to avoid a collision. Corresponding measures include, for instance, to reduce speed, or to change lane by slightly varying the steering direction. Step 912, applied in the case of a high probability of emergency in accordance with the example illustrated in FIG. 9, actively interferes with the vehicle control. Therefore, second processing unit 310 generates a signal to be forwarded to a controller (not shown in FIG. 4), which interprets the signal in order to carry out active measures in compliance with the signal information. For instance, an emergency braking can be triggered to avoid a rear-end collision accident.

The range of response actions to information retrieved from evaluation of a three-dimensional vector model (i.e., three-dimensional space-and-time model) is not limited to the examples given above. A large variety of other responses is possible. For instance, so-called passive countermeasures can be carried out, such as airbag control, seatbelt control and pedestrian protection control. In other examples, internal safety systems of a vehicle such as seatbelts and airbags generally undergo irreversible processes if fully deployed. Accordingly, these safety systems have to be replaced in the case of full deployment, even if a threatening accident still could have been avoided, and therefore the vehicle itself has not been damaged. It is therefore useful to perform some reversible pre-processing of vehicle safety systems, such as deployment of reversible seatbelt pretensioners, in the event that an accident occurs with a certain probability. The reversible pre-processing will minimize full deployment time, if the accident occurs, but it will not irreversibly damage the safety systems in case the accident still could be avoided. For instance, in accordance with the scheme of FIG. 9, reversible seatbelt pretensioners can be deployed, if step 906 judges a medium probability of impact, while the seatbelt is irreversibly locked, if step 912 judges a high probability.

An example of a pedestrian protection control system relying on information evaluated from the three-dimensional vector model in accordance with the invention is given below. The example pedestrian protection control system includes an active system that increases the attack angle of the engine hood of the vehicle to lessen the consequences for a pedestrian in the case of a collision with the front of the vehicle. A prerequisite is that a situation where a pedestrian threatens to collide with the front of vehicle is clearly detected and evaluated by the environment monitoring system.

Returning to FIG. 8, in accordance with the second path in the central position of the figure, in step 806 a vector model 404 (FIG. 4) generated in first processing unit 308 (FIGS. 3 & 4) is saved into event data recorder 406 (also known as a "black box"). A sequence of vector models may then be saved. The saving processing is controlled by the recording unit 410.

An event data recorder 406 saving a sequence of generated three-dimensional vector models 404 may be utilized as an alternative to a conventional black box that saves sensor data, In particular, when utilized on a camera equipped vehicle, raw video data may be stored by the event data recorder 406. On the one hand, the sequence of three-dimensional vector models 404 that is generated independently of the event data recorder 406, for other purposes, such as driver assistance and/or safety countermeasures, includes all important parameters necessary for reconstruction of an accident. These parameters include, but are not limited to size, kind, speed, direction and distance data of all objects over space and time relative to the vehicle. On the other hand, in view of the fact that a three-dimensional vector model 404 includes only extracted data that has been extracted by a data extraction algorithm, a considerably increased spatial and semantic density may be achieved compared to a conventional event data recorder, saving complete raw video scenes. Accordingly, while, for every instant of time, much less storage capacity than in a conventional event data recorder is required to store the relevant data for the construction of an accident, for a given overall storage capacity, the history time period available for accident reconstruction ("history depth") can be considerably increased. A comparison of the history depth between a conventional camera-based event data recorder and a traditional event data recorder in will be described further below in connection with FIGS. 10A and 10B.

Figure 10A:
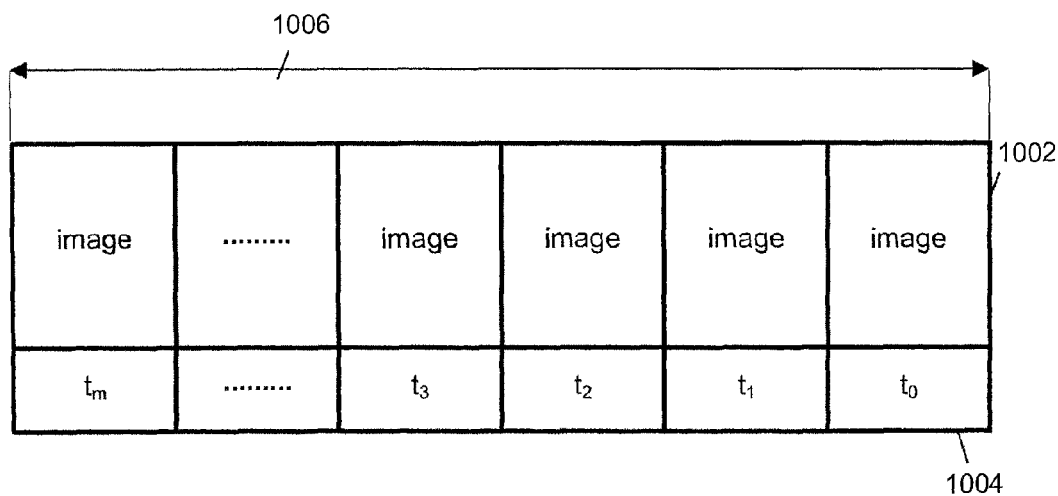
FIG. 10A schematically illustrates the storage of a conventional image based event data recorder.

FIG. 10A schematically illustrates a storage medium of a conventional event data recorder. The overall width of the scheme, indicated by double-sided arrow 1006 corresponds to the fixed overall storage capacity of the event data recorder 406. A sequence of images 1002, captured by at least one camera at predetermined instants of time 1004 is subsequently stored in respective portions of the storage medium with time stamps indicating the predefined instants of time 1004. For simplicity of illustration, only a single image is indicated to be stored for each instant of time. However, the prior art event data recorder, as illustrated, is not limited to the case of a single image to be stored, but a plurality of images captured by different two- and/or three-dimensional cameras can be stored, possibly together with data received from other sensors, at every instant of time as well. Time stamps $t_0, t_1, t_2, t_3, \ldots, t_m$ indicate time instances 1004 in increasing manner, i.e., so that $t_0 < t_1 < t_2 < t_3 < \ldots < t_m$. As illustrated, time instances for saving the images may be chosen to be equidistant. The overall number of subsequent images that can be stored in an event data recorder as illustrated in FIG. 10A is given by overall storage capacity 1006. Namely, if the first image has been stored at time instance $t_0$, and the overall storage capacity 1006 has been reached after storing the image at time instance $t_m$ as indicated in FIG. 10A, a total of m+1 images can be stored. Referring to the time scale, the difference between the first and the last image to be stored, i.e., the history depth as defined above, corresponds to the time difference between the last and the first time instance, i.e., $t_m - t_0$.

Figure 10B:
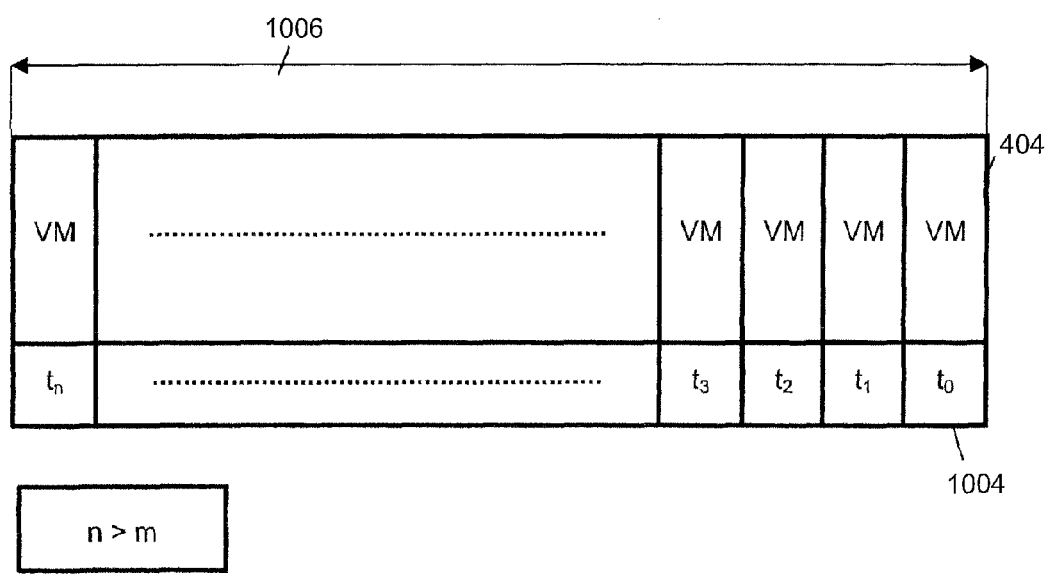
FIG. 10B schematically illustrates the storage of an event data recorder in accordance with an embodiment of the present invention.

FIG. 10B schematically illustrates a storage medium of an event data recorder, where a sequence of vector models 404 in accordance with the invention are stored. The overall storage capacity 1006 of the storage medium is assumed to be the same as in a conventional storage medium of FIG. 10A. In contrast to the example of FIG. 10A, in the event data recorder of FIG. 10B, for every time instance 1004, a corresponding vector model 404 is stored, rather than a single or a plurality of raw image data 1002 corresponding to the respective time instances 1004. As indicated above, the required storage volume per time instance is considerably lower in the case of vector model 404, and in the case of raw image data 1002. Accordingly, data of larger number time instances can be stored in the storage medium, as compared with the conventional case. In the example of FIG. 10B, for simplicity, it is assumed that the same time intervals between time instances for storing (e.g., equidistant) are employed than in FIG. 10A above.

Consequently, the number of vector models 404 that can be stored for the same overall storage capacity 1006 is larger than the number of images 1002 that can be stored in the conventional event data recorder of FIG. 10A. The respective relationship is illustrated by inequality n>m in FIG. 10B, where $t_n$ being the instance of time for the last vector model that can be stored within storage capacity 1006, after storage has been started at time instance $t_0$. In the illustrated case of equidistant time instance, consequently, history depth $t_n - t_0$ of FIG. 10B is larger than history depth $t_n - t_0$ of FIG. 10A.

It may be possible to further reduce the amount of data stored by additionally applying software compression algorithms such as MPEG. In particular, objects which remain included in the 3D environment over time can be reduced along the time line in that not each image needs to include the whole information about the object. In each subsequent image, a reference to an initial image including the whole information about the object would be sufficient.

Figure 11:
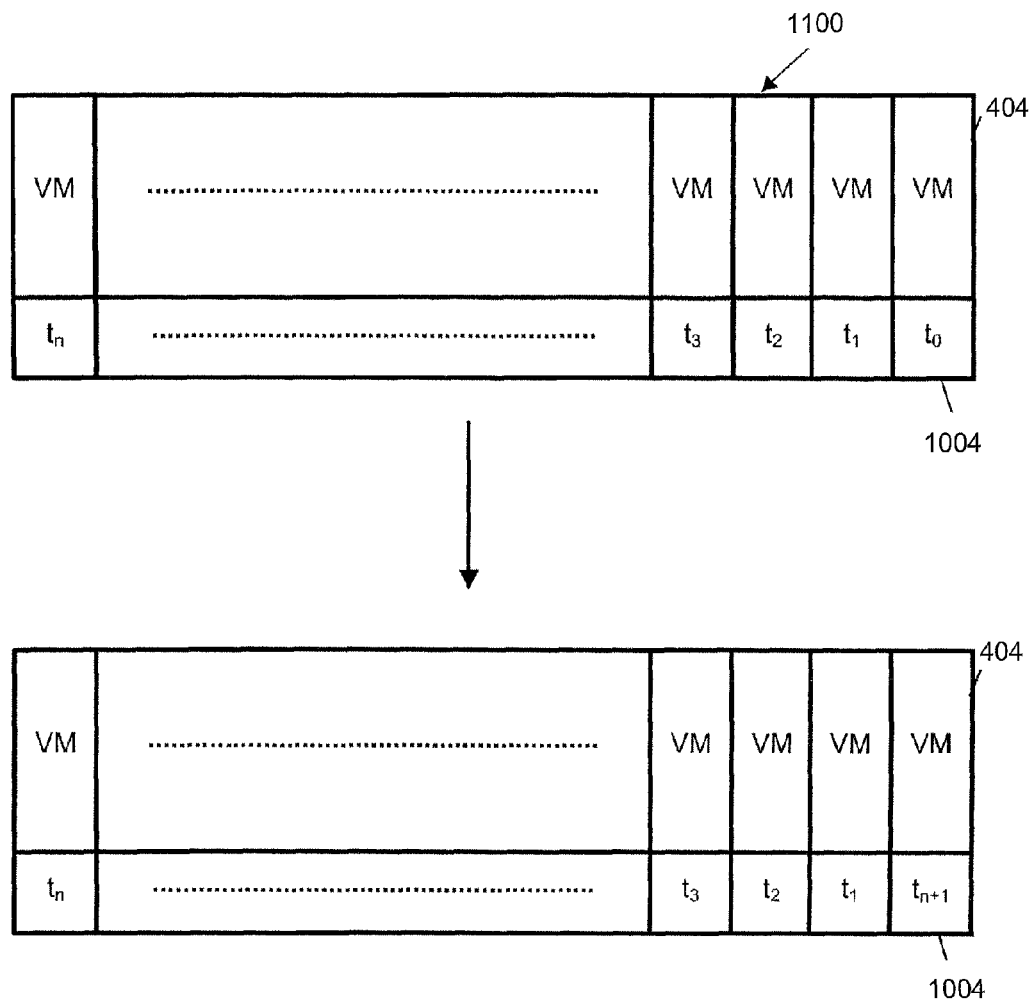
FIG. 11 schematically illustrates the concept of cyclically overwriting data in an event data recorder in accordance with an embodiment of the present invention.

FIG. 11 illustrates a concept of cyclically overwriting entries in the storage of an event data recorder storing vector models 404. Event data storage 1100 corresponds to the data storage as illustrated in FIG. 10B. However, for simplicity, the double arrow 1006 indicating the overall storage capacity has been omitted in FIG. 11. The scheme on top of FIG. 11 corresponds to the situation as illustrated in FIG. 10B, where n+1 vector models 404 correspond to time instances $t_0$ to $t_n$, have been stored in the storage. Accordingly, no free space is available for storing the next vector model 404 to be stored, at time instance $t_{n+1}$. In other words, the maximum available recording time (i.e., history depth) has been reached. As indicated by the arrow between the top and bottom scheme of FIG. 11, at a time point $t+_{n+1}$ vector model 404 having the earliest time stamp, $t_0$, is deleted and the respective storage portion is occupied by vector model 404 with time stamp $t_{n+1}$. In other words, at time $t_{n+1}$ the vector model having time stamp $t_0$ is overwritten by the vector model with time stamp $t_{n+1}$. Accordingly, the overall number of stored vector models, and at the same time, under the assumption of equidistant time stamps, the history depth remains constant: $t_{n+1} - t_1 = t_n - t_0 = n(t_1 - t_0)$.

In one example of an implementation, the concept of cyclically overwriting the vector models stored in the data recorder 406 may be applied as long as no emergency situation is registered. In the case of an emergency situation, such as an accident leading to an impact being detected, history recording unit 410 receives the signal to immediately stop further recording. Consequently, it is guaranteed that in the case of an accident really occurring, history information in the form of vector model 404 is always available for a time period corresponding to history depth $t_n - t_0$, immediately before the occurrence time of the accident.

A problem may occur if the sensor does not properly recognize an object such that the 3D vector model is incomplete or wrong. The problem may be reduced by including an additional, very small ring buffer that stores few images directly from the video cameras (for instance only every 2 to 5 seconds). These images could be employed for verifying the vector model. Since the additional buffer is very small, the data reduction is still considerable as compared to a conventional black box that is not based on the vector model.

Returning back to FIG. 8, an example will be now be explained with reference to the processing paths on the right hand side of FIG. 8, where vector model 404 is transmitted to an external location, for further processing and evaluation. In step 808, vector model 404 generated at step 712 (FIG. 7) by the first processing unit 308 is transmitted by an antenna 304 (FIG. 3) to an external site, located remotely from the vehicle 300 (FIG. 3).

Transmission may be performed over a standard transmission channel, such as radio or a cellular telephone line. Transmitting the vector model 404 to the external location is not, however, limited to these. Any transmission technique available at present or in the future can be employed. For example, a sequence of vector models 404 representing a three-dimensional space-and-time model is transferred.

In subsequent step 810, the transmitted vector model 404 undergoes external processing. External processing may be performed by a computer system provided at the external location. Various kinds of external processing can be performed, including those which are generally similar to the processing evaluation performed internally in step 802 described above by second processing unit 310 (FIGS. 3 & 4). In one example of an implementation, external processing performed at step 810 also includes rendering the information from vector model 404 for display at an external computer. A remote location, where external processing is performed may be a stationary location. Processing at a mobile location, such as a specialized vehicle, may also, or alternatively, be performed. Since computer systems available at a stationary location are generally more powerful than the specialized processing units available on-board the vehicle, more sophisticated processing procedures can be generally performed at the remote location. Thereby, a response can be generated in quasi-real time. The real time requirements can be particularly fulfilled in view of the possibility of transmitting the processing data by a channel having a limited bandwidth, in the form of the vector models 404 having specifically reduced data volume.

At step 812, a processing result from external evaluation is re-transmitted to the vehicle. The medium used for transmission of vector model 404 from vehicle 300 to the remote location may also be utilized for re-transmission.

On the basis of the processing result re-transmitted in step 812, remote control of the vehicle can be achieved (step 814). The processing result is transmitted at step 812 to vehicle 300 in form of data representing processing results that have to be interpreted in step 814 at the vehicle for vehicle control. A person skilled in the art is aware that alternatively a signal for vehicle control can be directly generated at the remote location, and be transmitted to the vehicle so as to be directly used by a specifically adapted control unit located at the vehicle.

It is further noted that transmission of vector models 404 from vehicle 300 to a remote location is not limited to the example explained above. Transmission of vector model information can be utilized for various other purposes and objects, including visualization at an external computer, for instance, to watch drivers undergoing training in a closed training area from a central site by a single instructor. Another area of application of a vector model 404 transmitted to a remote location is immediate notification of accidents or other extraordinary events occurring with specialized vehicles, such as VIP cars, to a central instance.

Figure 12:
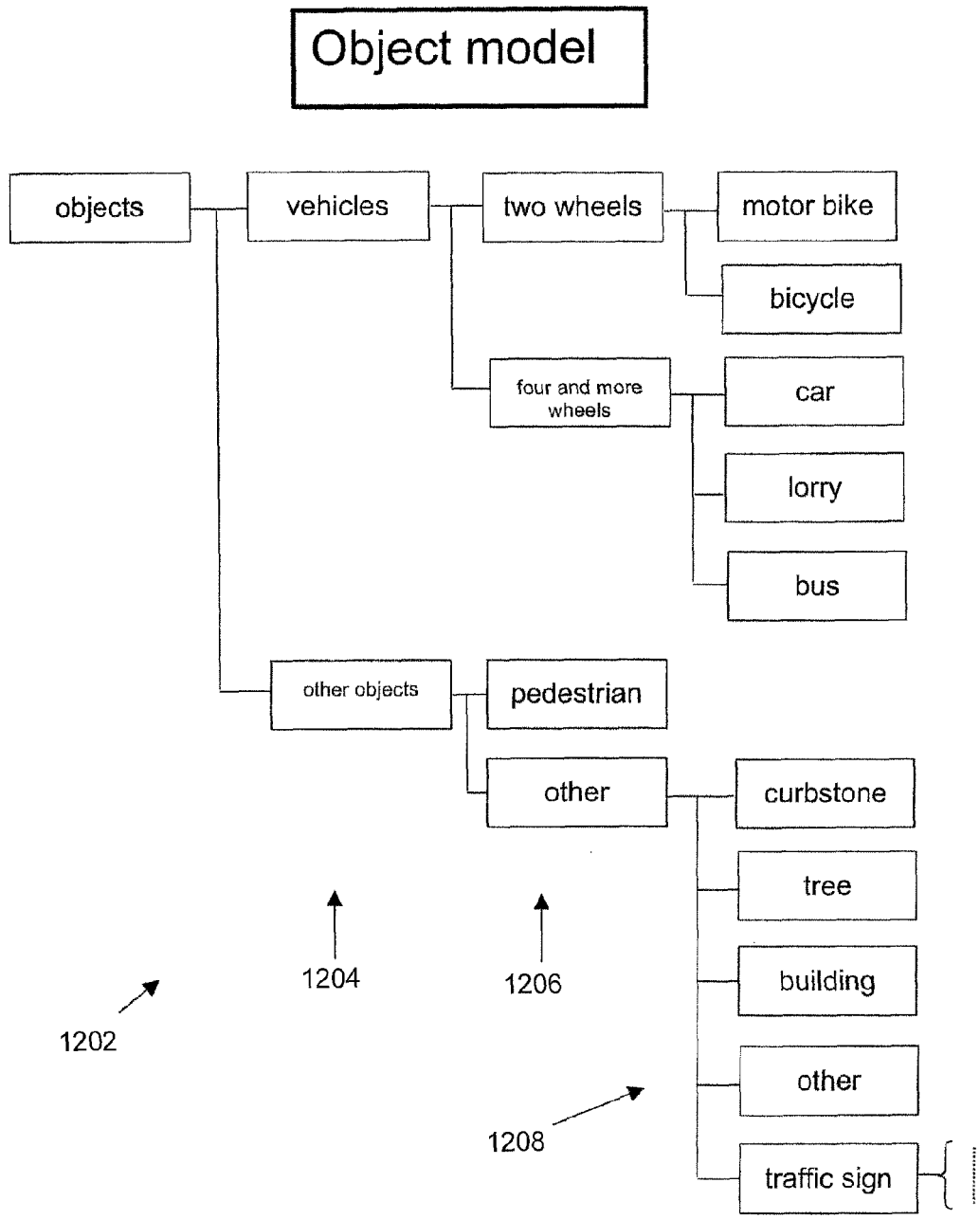
FIG. 12 illustrates the structure of an object model employed in accordance with an embodiment of the present invention.

FIG. 12 illustrates the overall structure of an object model 1202 that may be employed for generating vector model 404 (FIG. 4) in accordance with one example of an implementation of the invention. Object model 1202 classifies a plurality of objects, in the form of a hierarchically arranged tree-like structure, into classes and sub-classes. Each class and sub-class corresponds to a particular level of the hierarchical tree structure. In FIG. 12, three levels of an object model are shown for illustration. In the example of object model 1202 illustrated in FIG. 12, the number of illustrated levels are only given by way of example and are not intended for limitation. Every object class/sub-class on a particular level is associated with object classification information. The object classification information indicates that a particular object has to be distinguished from objects belonging to other classes at the same hierarchical level. Examples of object information for three object class levels 1204, 1206, 1208 are given in the boxes in FIG. 12.

FIG. 12 illustrates an example of an object model having hierarchical object classification that is particularly adapted to objects occurring in a vehicle's environment that are most likely to be captured by a three-dimensional camera, such as camera 302a (FIG. 3) mounted on a vehicle 300. If an object that is present in a captured image has been recognized as belonging to an entity of the object classes on a particular level, a vector describing the respective object in the vector model is associated with the corresponding object classification information. The object classification information serves as a pointer to data representing characteristic features of all objects of the respective class that are available at the database 412 (FIG. 4), and can be accessed when processing the respective object indicated by the vector model 404 (FIG. 4).

The information contained in the vector model 404 can thus be rendered more detailed by increasing the number of levels of the object model. In accordance with the increasing number of sub-classes with a larger amount of levels, more and more detailed information can be provided to be accessed from the vector model 404, in compliance with the classification information of an object described by single or a plurality of vectors. On the other hand, the amount of information (e.g., reflected by a corresponding data volume) increases with an increasing number of hierarchical levels as well. Therefore, on the basis of the hierarchical level of the model, a trade-off between information content and data volume can be easily achieved by extending or restricting the number of hierarchy levels, depending on the current situation.

In the case of the object model of FIG. 12, at the first hierarchy level 1204, all objects are classified into vehicles and other objects. On second hierarchy level 1206 of the illustrated object model, each class of level 1 is sub-divided into two sub-classes. Namely, the class of vehicles comprises sub-classes of two-wheeled vehicles, and of vehicles having four and more wheels. The class of all other objects is sub-divided into a sub-class of pedestrians, and a sub-class of all other objects.

A more detailed description of objects is enabled, if a vector model additionally includes information relating to object classification on the third hierarchical level 1208. It is not, however, necessary for a particular class or sub-class of a specific level to be further sub-divided on the next level. For instance, the sub-class of pedestrians of second level 1206 is not further sub-divided on third level 1208. The other exemplary sub-classes of second level 1206 are further sub-divided, where the number of sub-classes of third level 1208 varies. Namely, the exemplary sub-class of two-wheeled vehicles is sub-divided twice into the third level sub-classes 1208 of motorbikes and bicycles. The second level sub-class 1206 of vehicles with four and more wheels is sub-divided into the three third level sub-classes 1208 of cars, lorries and buses. The second level sub-class 1206 of other objects is sub-divided into five third level sub-classes 1208, of curbstones, trees, buildings, traffic signs and other objects. As indicated on the right hand side of FIG. 12, further sub levels are possible for some, or all, of the object sub-classes of third level 1208. For instance, traffic signs can be classified into fixed traffic signs, and traffic signs with a variable meaning (such as traffic lights).

In summary, a vehicle environment monitoring system is provided that is based on a three-dimensional vector model 404 (FIG. 4). The three-dimensional vector model 404 of the vehicle's environment is generated on the basis of the image data captured by at least a three-dimensional camera. Out of the image data, particular data are extracted for generating the three-dimensional vector model 404 to reduce the data volume. For data extraction, a data extraction algorithm (step 704, FIG. 7) is applied that is determined in accordance with at least one parameter that relates to the situation of the vehicle. Accordingly, the system specifically targets data extraction that is performed for generating a three-dimensional model 404 particularly adapted for an application that is desired in the current vehicle situation. The applications of the vector model include driver assistance, external monitoring and vehicle control, as well as recording in an event data recorder 406, to which a sequence of three-dimensional vector models, representing a three-dimensional space-and-time model, is generated.

In particular, the invention employs a situation-dependent extraction of particular data from a captured three-dimensional image of an environment of a vehicle. The amount and character of the data that are extracted are determined and adapted to the specific situation and the intended target of the environment monitoring. The particular data extracted out of the image information are employed for generating a three-dimensional vector model of the vehicle environment from a captured three-dimensional image. Thereby, a situation-dependent reduction of the complete information captured by a three-dimensional camera is enabled, and a high density of monitoring information may be achieved in a target-oriented manner.

In one example, the information content of the three-dimensional vector model may be made available for further processing. In particular, a driver assistance system can employ the three-dimensional vector model for generating measures for assisting a driver in response to environment information reflected in the 3D-vector model. Accordingly, the step of generating the 3D-vector model decouples the environment data collection from the intelligence for issuing a response in a situation adapted manner. Therefore, a tradeoff between response time requirements and accuracy of information content may be achieved.

For example, the data extraction algorithm may be adapted to the processing time available for generating the 3D-vector model. Accordingly, the system enables a situation adapted balancing between processing time and information content requirements. For instance, for driver assistance of a vehicle driving at a high speed on a motorway, it may be critical to have a response time as short as possible. As the system response time basically depends on the processing time, it is therefore advisable to extract only the most security relevant data, and to discard that data that is of no or only minor relevance for vehicle security in generating the model, in order to save processing time. On the other hand, in a situation such as employing the model for assisting in parking a car, the response time is not of such critical importance. Therefore, the model generated for parking assistance can process more information and thus achieve a higher accuracy, which may be helpful when parking a car.

The system may further determine a maximum amount of processing time correlating to a specific vehicle situation. In which case, a maximum amount of data to be extracted can be further determined. The processing time and the respective response time basically depend on the data amount to be processed. It is thereby guaranteed that the response time can be kept within an upper limit that is predetermined for the specific situation.

To assist with processing time, the data extraction algorithm may include object recognition. Object recognition enables the representation of features of predefined objects in an especially data saving manner. The data extraction algorithm may include filtering the captured three-dimensional image. Accordingly, the image may be pre-processed to reduce the data amount and to avoid an undesired inaccuracy.

In a further example, the data extraction algorithm may extract data only from a part of the three-dimensional image corresponding to a certain visual field. For instance, in a case of driving at a high speed, the most relevant information may be contained in a visual field representing a narrow cone-shaped sector in forward and backward direction of the driven car. In this case, it may be necessary to quickly grasp changes in the traffic situation, even those occurring at a far distance. On the other hand, for parking a car under conditions of limited space, it may be helpful to have an all-round view, which can, however, be limited to a narrow range of distance.

The extraction algorithm may further be determined taking into account a priority for different kinds of data to be extracted from the three-dimensional image. For different vehicle situations and for different purposes of employing the three-dimensional vector model, different kinds of data are of importance, while other data are less important or can be completely disregarded. Under the condition of a limited amount of data to be processed, it is therefore desirable not only to define an upper limit of the data amount, but also to define priorities of the different kinds of data to be extracted, until the limit of data amount is reached. For instance, for collision warning on a motorway, most relevant kinds of data are positions and relative velocity to other vehicles on the motorway. On the other hand, for a parking assistance, detailed object information of all objects is required, but only in a low distance range around the vehicle.

Accordingly, the vehicle situation may be analyzed based on the captured three-dimensional image itself, in order to obtain a parameter characterizing the current vehicle situation. Object recognition can, for instance, determine based on an image, whether a vehicle is being driven in dense traffic or not. Also environmental parameters such as the width of the road can be easily recognized from an image.

Detecting vehicle status information in addition to the information captured by the three-dimensional camera provides a value of a parameter for characterizing the vehicle situation. In particular, the detected vehicle status information may include velocity information of the vehicle. Accordingly, the parameters that are generally measured in a vehicle can be employed for determining the data extraction algorithm, without any further effort. The size of the visual field from which the data extraction algorithm extracts data is smaller the higher the velocity of the vehicle. Accordingly, information from a larger distance can be taken into account while not enlarging the overall data amount.

The environment monitoring system may be further capable of taking into account a parameter value that has been received from an input interface. For instance, a switchover may be enabled between a parking assistant mode and a mode for assisting a driver in dense traffic. The determination of the extraction algorithm then includes defining variables of an algorithm. For instance, filtering parameters for filtering a complete image of a part of an image can be adjusted in accordance with accuracy and data amount requirements. Further, a particular one of a plurality of available data extraction algorithms may be selected on the basis of a parameter describing the vehicle situation.

As discussed above, the three-dimensional vector model represents objects in the environment of the vehicle by vectors and object specification information. The object specification information associates an object with standard object classes of an object model. Employing an object model may assist in connection with object recognition. A recognized object is associated with standard object information of a database. It is therefore not necessary to process information once more every time when a new object belonging to one of the standard classes occurs.

When utilizing an object model, the object model is stored in a database. A database enables the pre-storing of standard information of such objects that are most likely to occur and most relevant to the vehicle's environment, such as other vehicles, persons and traffic signs.

In another example, the system may generate a sequence of three-dimensional vector models during a certain period of time. Thereby, a three-dimensional space-and-time model is obtained. Moreover, a coordinate system fixed to the vehicle may be used as a reference system for the vectors of the sequence of the three-dimensional vector models. Employing a vehicle centered reference system may enable the most natural view of all modifications occurring in the vehicle's environment with time, as only the changes occurring relative to the vehicle are of importance.

In yet another example of a system, a response to the information of the vehicle environment represented by the three-dimensional space-and-time model is generated. Accordingly, the three-dimensional space-and-time model is employed to realize functions for assisting a driver, or directly interfering with vehicle control. For example, a generated response is directed towards avoiding an emergency situation such as the threat of a collision or a loss of the driver's control over his vehicle. The response may comprise a notification of an indication of an emergency situation to be expected to the driver. The notification can be issued in the form of an acoustic signal and/or a warning on a display within the field of vision of the driver. Further, a device for assisting a driver to avoid an emergency situation may be notified. A response generated on the basis of the three-dimensional space-and time model may include an automatic interference with vehicle control. For instance, the system of the invention may enable automatic braking, if any notifications of collision warning have been ignored for a predetermined time, or if it is judged, on the basis of the three-dimensional space-and time model that the probability of a collision has become larger than a predefined threshold.

The three-dimensional vector model may be further processed for assisting a driver in controlling the vehicle based on the processing result. For example, the generated response may be directed towards assisting a driver in parking the vehicle. Such responses may include taking countermeasures to minimize the consequences of a threatening accident. In particular, the counter measures may include status control of vehicle safety equipment, such as an airbag or a seatbelt. For instance, if the three-dimensional space-and time model indicates that a collision is likely to occur, an airbag can be controlled to be transferred in a pre-triggered status. Accordingly, the airbag can be released faster, if the collision indeed occurs. On the other hand, if it is nevertheless possible to still avoid the collision, the airbag can be returned to the normal status, and remains unused.

While the illustrated example shows a three-dimensional image captured from at least one camera, the system may capture a plurality of three-dimensional images from plural camera positions. More preferably, the plurality of three-dimensional images may represent an environment area including a predetermined range around the vehicle. As the field of vision of a single camera is generally limited, a plurality of cameras can provide more complete information about the environment of the vehicle. Alternatively, a position of a single camera can be controlled so as to provide a different view. For instance, a camera can be panned around.

In addition to image data to be captured by a camera, also data from further sensors a vehicle is equipped with are taken into account for generating the three-dimensional vector model. For example, for generating the three-dimensional vector model, a process of sensor fusion may be employed to transform sensor data into a unique format. During sensor fusion, moreover, data acquired from different sensors is checked for inconsistencies. Inconsistent and redundant data is removed during sensor fusion. Image data is included into the process of sensor fusion. Such further sensors employed for generating the three-dimensional vector model may include a motion sensor, an accelerometer, a temperature sensor, a radar sensor and/or an infrared sensor.

In one example implementation of a system, as explained in detail above, the three-dimensional vector model is transmitted to an external location with respect to the vehicle, which external location may be remote or stationary. A sequence of three-dimensional vector models representing a three-dimensional space-and-time model is transmitted to the external location. For example, the three-dimensional vector model may be transmitted by radio, by cellular telephone line, or other available communication transmission methods. The three-dimensional vector model may be transmitted for visualizing on an external computer. Accordingly, for instance, an instructor of a driving school can watch a plurality of vehicles undergoing training in a training area.

When transmitted externally, the three-dimensional vector model may be further evaluated in an external computer. The results of the evaluation may then be transmitted back to the vehicle. More preferably, the evaluation results are employed for remotely controlling the vehicle. Either, the re-transmitted evaluation results are utilized for generating and issuing the control signal at the vehicle itself. Alternatively, a control signal can be generated at the external location, so that only the control signal itself is re-transmitted to the vehicle.

As the bandwidth available for transmission of signals between a driven vehicle and an external location is generally limited, the system of the invention enables maximum employment of the available bandwidth via a maximally targeted selection of data to be extracted for generating the three-dimensional vector model.

In another example implementation, the three-dimensional vector model is saved in an event data recorder. An event data recorder enables reconstruction of crash details in the case of an accident. A sequence of three-dimensional vector models that has been generated during a predetermined period of time is saved into the event data recorder. The three-dimensional vector models of the sequence may be associated with time stamps before saving. Still more preferably, the three-dimensional vector models are saved for a predetermined storing time, which approximately corresponds to an available storage capacity. Only in the case that an impact is detected that is most probably caused by an extraordinary event such as an accident, the three-dimensional vector models remain permanently saved, while further storage of newly generated vector models is inhibited. The three-dimensional vector models may also be stored in a cyclic storage having a predetermined storage capacity, and are cyclically overwritten, as long as no impact is detected.

Targeted extraction of data from complete information enabled by cameras attached to a vehicle generally reduces the amount of data to be stored for a certain instance of time. Accordingly, for a storage capacity of an event data recorder, a history that can be stored becomes much longer when compared with a conventional camera based event data recorder storing complete image information.

It will be understood, and is appreciated by persons skilled in the art, that one or more processes, sub-processes, or process steps described in connection with FIGS. 4-11 may be performed by a combination of hardware and software. The software may reside in software memory internal or external to the signal processor 308, 310 or other controller, in a suitable electronic processing component or system such as, one or more of the functional components or modules schematically depicted in FIGS. 3, 4 and 5. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any tangible computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store, communicate, propagate, or transport the program for use by or in connection with the instruction execution system, apparatus, or device. The computer readable medium may selectively be, for example, but is not limited to, an electronic, magnetic, optical, electromagnetic, infrared, or semiconductor system, apparatus, device, or medium. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic), and a portable compact disc read-only memory "CDROM" (optical) or similar discs (e.g. DVDs and Rewritable CDs). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although the previous description only illustrates particular examples of various implementations, the invention is not limited to the foregoing illustrative examples. A person skilled in the art is aware that the invention as defined by the appended claims can be applied in various further implementations and modifications. In particular, a combination of the various features of the described implementations is possible, as far as these features are not in contradiction with each other. Accordingly, the foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method of monitoring the environment of a camera-equipped vehicle, comprising the steps of:
    capturing a three-dimensional (3D) image of the environment of the vehicle by a camera, the 3D-image representing a predetermined area or the vehicle environment;
    determining a data extraction algorithm to be employed to reduce the amount of information acquired in said image capturing step based on at least one parameter characterizing the vehicle situation, the data extraction algorithm being is selected out of a plurality of data extraction algorithms based on the at least one parameter:
    reducing the amount of information acquired in said image capturing step by extracting data from said 3D-image employing the data extraction algorithm; and
    generating a 3D-vector model of the vehicle environment from said data extracted from said 3D-image.

2. The method of claim 1, where said extraction algorithm determining step determines the data extraction algorithm to be adapted according to the processing time available for generating the 3D-vector model.

3. The method of claim 1, where said extraction algorithm determining step determines the data extraction algorithm to be adapted according to information reflected in the 3D-vector model.

4. The method of claim 1, where said data extraction algorithm includes object recognition.

5. The method of claim 1, where said data extraction algorithm extracts data only from a part of the 3D-image corresponding to a certain visual field.

6. The method of claim 1, further comprising the step of further processing said 3D-vector model for assisting a driver in controlling the vehicle based on the processing result.

7. The method of claim 6, where said extraction algorithm determining step includes the step of determining a maximum available amount of time for performing said steps of generating and further processing said 3D-vector model based on the vehicle situation, and further takes into account said maximum available amount of time to determine said data extraction algorithm.

8. The method of claim 7, where said extraction algorithm determining step includes the step of determining a maximum amount of data to be extracted in correspondence with said maximum amount of time.

9. The method of claim 8, where said extraction algorithm determining step further includes the step of determining priorities for different kinds of data that can be extracted from said 3D-image based on the particular relevance of different kinds of data in the vehicle situation characterized by said at least one parameter.

10. The method of claim 1, where said extraction algorithm determining step further includes the step of analyzing the vehicle situation based on the captured 3D-image, where a value of said at least one parameter is obtained from said analyzing step.

11. The method of claim 1, further comprising the step of detecting vehicle status information, where the detected vehicle status information includes a value of said at least one parameter.

12. The method of claim 11, where said vehicle status information includes velocity information of said vehicle, and where the size of the visual field from which said data extraction algorithm extracts data decreases as the velocity of the vehicle increases.

13. The method of claim 1, where said 3D-vector model represents objects in the environment of the vehicle by vectors and object classification information, said object classification information associates an object with standard object classes of an object model.

14. The method of claim 13, where said object model is pre-stored in a database containing standard information of such objects that are most likely to occur and most relevant to the vehicle's environment.

15. The method of claim 1, further comprising the step of:
    generating a 3D-space-and-time model, where said 3D-space-and-time model includes a sequence of 3D-vector models.

16. The method of claim 15, further comprising the step of generating a response to the information of the vehicle environment represented by said 3D-space-and-time model.

17. The method of claim 16, where said response is directed towards avoiding an emergency situation to be expected by a driver.

18. The method of claim 17, where said response includes an automatic interference with the vehicle control.

19. The method of claim 16, where said response is directed towards assisting a driver in parking the vehicle.

20. The method of claim 16, where said response includes taking countermeasures to minimize the consequences of a threatening accident.

21. The method of claim 1, where said image capturing step captures a plurality of 3D-images from various camera positions, where said plurality of 3D-images represent an environment area including a predetermined range around the vehicle.

22. The method of claim 1, where said 3D-vector model generating step further employs data from sensors.

23. The method of claim 22, further comprising the step of sensor fusion to transform sensor data into a unique format and remove inconsistent and/or redundant data.

24. The method of claim 1, further comprising the step of transmitting the 3D-vector model to an external location with respect to said vehicle.

25. The method of claim 24, where said 3D-vector model is transmitted via wireless communication.

26. The method of claim 24, where said 3D-vector model is transmitted to and visualized on an external computer.

27. The method of claim 24, further comprising the step of evaluating said 3D-vector model at an external computer.

28. The method of claim 27, further comprising the step of re-transmitting results of said evaluation back to the vehicle.

29. The method of claim 27, further comprising the step of remotely controlling the vehicle by employing the evaluation results.

30. The method of claim 24, where said transmitting step transmits a sequence of 3D-vector models representing a 3D-space-and-time model.

31. The method of claim 1, further comprising the step of saving the 3D-vector model in an event data recorder.

32. The method of claim 31, further comprising the steps of:
generating a sequence of 3D-vector models during a pre-determined period of time; and
saving said sequence of 3D-vector models into the event data recorder.

33. The method of claim 32, further comprising the step of associating the 3D-vector models with time stamps before saving into the event data recorder.

34. The method of claim 33, where the 3D-vector models are saved for a predetermined storing time;
the method further comprising the step of detecting an impact caused by an extraordinary event, where the 3D-vector models remain permanently saved upon said detection of an impact.

35. The method of claim 34, where said 3D-vector models are stored in a cyclic storage having a predetermined storage capacity;
the method further comprising the step of cyclically overwriting stored 3D-vector models having the earliest time stamp, until said detection of an impact.

36. An environment monitoring device for monitoring the environment of a vehicle, comprising:
a three-dimensional (3D) camera for capturing an image of the environment of the vehicle, the image representing a predetermined area of the vehicle environment; and
a first computer processing unit for processing the information acquired by said 3D-camera, said first processing unit including:
a computerized determining unit for determining a data extraction algorithm to be employed to extracting data from said image based on at least one parameter characterizing the vehicle situation, the data extraction algorithm being is selected out of a plurality of data extraction algorithms based on the at least one parameter;
a computerized data extracting unit for extracting data from said image by employing the data extraction algorithm; and
a computerized model generation unit for generating a 3D-vector model of the vehicle environment from said data extracted from said image.

37. The environment monitoring device of claim 36, where said determining unit determines the data extraction algorithm to be adapted according to the processing time available for generating the 3D-vector model.

38. The environment monitoring device of claim 36, where said determining unit determines the data extraction algorithm to be adapted according to information reflected in the 3D-vector model.

39. The environment monitoring device of claim 36, where said data extraction algorithm includes object recognition.

40. The environment monitoring device of claim 36, where said data extraction algorithm extracts data only from a part of the image corresponding to a certain visual field.

41. The environment monitoring device of claim 36, further comprising a second computer processing unit for further processing said 3D-vector model for assisting a driver in controlling the vehicle based on the processing result.

42. The environment monitoring device of claim 41, where said determining units determines a maximum available amount of time for generating and further processing said 3D-vector model based on the vehicle situation, and further takes into account said maximum available amount of time for determining said data extraction algorithm.

43. The environment monitoring device of claim 42, where said determining unit determines a maximum amount of data to be extracted in correspondence with said maximum amount of time.

44. The environment monitoring device of claim 43, where said determining unit further determines priorities for different kinds of data that can be extracted from said image based on the particular relevance of different kinds of data in the vehicle situation characterized by said at least one parameter.

45. The environment monitoring device of claim 36, where said determining unit further analyzes the vehicle situation based on the captured image for obtaining a value of said at least one parameter.

46. The environment monitoring device of claim 36, further comprising a detector for detecting vehicle status information, where the detected vehicle status information includes a value of said at least one parameter.

47. The environment monitoring device of claim 46, where said vehicle status information includes velocity information of said vehicle, and where the size of the visual field from which said data extraction algorithm extracts data decreases as the velocity of the vehicle increases.

48. The environment monitoring device of claim 36, where said 3D-vector model represents objects in the environment of the vehicle by vectors and object classification information, said object classification information associates an object with standard object classes of an object model.

49. The environment monitoring device of claim 48, further comprising a database for pre-storing said object model.

50. The environment monitoring device of claim 48, where said extraction algorithm obtains object classification information from the image.

51. The environment monitoring device of claim 36, where said model generation unit generates a 3D-space-and-time model that includes a sequence of 3D-vector models.

52. The environment monitoring device of claim 51, further comprising a second processing unit for generating a response to the information of the vehicle environment represented by said 3D-space-and-time model.

53. The environment monitoring device of claim 52, where said response is directed towards avoiding an emergency situation to be expected by a driver.

54. The environment monitoring device of claim 53, further comprising a device for notifying a driver of an expected emergency situation based on the response generated by said second processing unit.

55. The environment monitoring device of claim 53, further comprising a device for assisting a driver to avoid an emergency situation based on the response generated by said second processing unit.

56. The environment monitoring device of claim 55, where said device is a controller for automatically interfering with the vehicle control based on the response generated by said second processing unit.

57. The environment monitoring device of claim 52, where said response is directed towards assisting a driver in parking the vehicle.

58. The environment monitoring device of claim 52, further comprising a controller for taking countermeasures to minimize the consequences of a threatening accident based on the response generated by said second processing unit.

59. The environment monitoring device of claim 36, comprising a plurality of 3D cameras for capturing images from various camera positions, where the images captured by said plurality of 3D-cameras representing an environment area include a predetermined range around the vehicle.

60. The environment monitoring device of claim 36, further comprising sensors, where said model generation unit further employs data from said sensors for generating said 3D-vector model.

61. The environment monitoring device of claim 60, further comprising a sensor fusion unit for transforming sensor data into a unique format and removing inconsistent and/or redundant data.

62. The environment monitoring device of claim 36, further comprising a transmitter for transmitting the 3D-vector model to an external location with respect to said vehicle.

63. The environment monitoring device of claim 62, where said transmitter transmits said 3D-vector model via wireless communication.

64. The environment monitoring device of claim 62, where said transmitter transmits said 3D-vector model for visualizing on an external computer.

65. The environment monitoring device of claim 62, where said transmitter transmits said 3D-vector model for evaluating at an external computer.

66. The environment monitoring device of claim 65, further comprising receiving unit for receiving results of said evaluation transmitted back to the vehicle.

67. The environment monitoring device of claim 65, further comprising a controller for controlling the vehicle by employing the evaluation results received from the external computer.

68. The environment monitoring device of claim 62, where said transmitter transmits a sequence of 3D-vector models representing a 3D-space-and-time model.

69. The environment monitoring device of claim 36, further comprising an event data recorder for saving the 3D-vector model.

70. The environment monitoring device of claim 69, where said model generation unit generates a sequence of 3D-vector models during a predetermined period of time, and where said sequence of 3D-vector models is saved into the event data recorder.

71. The environment monitoring device of claim 70, where the 3D-vector models are associated with time stamps before saving.

72. The environment monitoring device of claim 71, further comprising an impact detector for detecting an impact caused by an extraordinary event, where the 3D-vector models are saved in the event data recorder for a predetermined storing time and the 3D-vector models remain permanently saved when an impact is detected by said impact detector.

* * * * *